US012719740B2

(12) United States Patent
Cuavas et al.

(10) Patent No.: US 12,719,740 B2
(45) Date of Patent: Aug. 25, 2026

(54) FALLOUT HANDLING FOR ZERO TOUCH PROVISIONING OF CELL SITES

(71) Applicants: DISH Wireless L.L.C., Littleton, CO (US); DISH Network Technologies India Private Limited, Bengaluru (IN)

(72) Inventors: Orlando Cuavas, Littleton, CO (US); Prakash Srinivasan, Highlands Ranch, CO (US); Rama Krishna Ganagalla, Visakhapatnam (IN); Jeyanth RajanBabu, Denver, CO (US); John Sabando, Littleton, CO (US); Christopher Taylor, Littleton, CO (US); Arnold Agcaoili, Littleton, CO (US)

(73) Assignees: DISH Wireless L.L.C., Littleton, CO (US); DISH Network Technologies India Private Limited, Bengaluru (IN)

( * ) Notice: Subject to any disclaimer, the term of this patent is extended or adjusted under 35 U.S.C. 154(b) by 498 days.

(21) Appl. No.: 18/492,005

(22) Filed: Oct. 23, 2023

(65) Prior Publication Data

US 2025/0132971 A1 Apr. 24, 2025

(51) Int. Cl.

| | |
|---|---|
| ***H04L 41/0654*** | (2022.01) |
| ***H04L 1/24*** | (2006.01) |
| ***H04W 28/04*** | (2009.01) |

(52) U.S. Cl.

CPC ............ *H04L 41/0654* (2013.01); *H04L 1/24* (2013.01); *H04W 28/04* (2013.01)

(58) Field of Classification Search

CPC ...... H04W 16/18; H04W 16/20; H04W 16/22

See application file for complete search history.

(56) References Cited

U.S. PATENT DOCUMENTS

| | | | |
|---|---|---|---|
| 10,680,913 B1 | 6/2020 | Achi Vasudevan et al. | |
| 2019/0335340 A1* | 10/2019 | Scanferla | H04W 24/02 |
| 2022/0369067 A1 | 11/2022 | Chen et al. | |
| 2023/0110983 A1* | 4/2023 | He | H04L 41/0896 370/217 |
| 2024/0179061 A1 | 5/2024 | Shrinagar et al. | |
| 2024/0187868 A1* | 6/2024 | Chathankandath | H04L 47/70 |

OTHER PUBLICATIONS

Mehrban, Ali, et al. "Integrating Zero Trust Architecture in O-RAN: A Comprehensive Survey and Analysis." IEEE Open Journal of the Communications Society 6 (2025): 10465-10495. (Year: 2025).*

Huang, et al., "Validation of Current O-RAN Technologies and Insights on the Future Evolution", Institute of Electrical and Electronics Engineers Journal on Selected Areas in Communications, vol. 42, No. 2, Nov. 28, 2023, pp. 487-505.

* cited by examiner

*Primary Examiner* — Sharad Rampuria

(74) *Attorney, Agent, or Firm* — Kilpatrick Townsend & Stockton LLP

(57) ABSTRACT

A fallout engine performs fallout handling for workflows in deploying a cell site and helps to ensure that any errors in operations performed in earlier stages are addressed before moving onto a later stage. The fallout engine identifies the occurrence of one or more errors that occur during a pre-check before execution of the stage, during the execution of the stage, or a post-check after execution of the stage. The fallout engine determines the occurrence of an error, determines the appropriate party/component to remedy the error, and can re-starts the workflow at the point of the error, or before the error.

16 Claims, 19 Drawing Sheets

Validation Engine In Detail

312

Requests

Load Balancer 502

504

Job Queue 506

508

Message Cache 510

FIG. 5

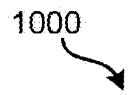
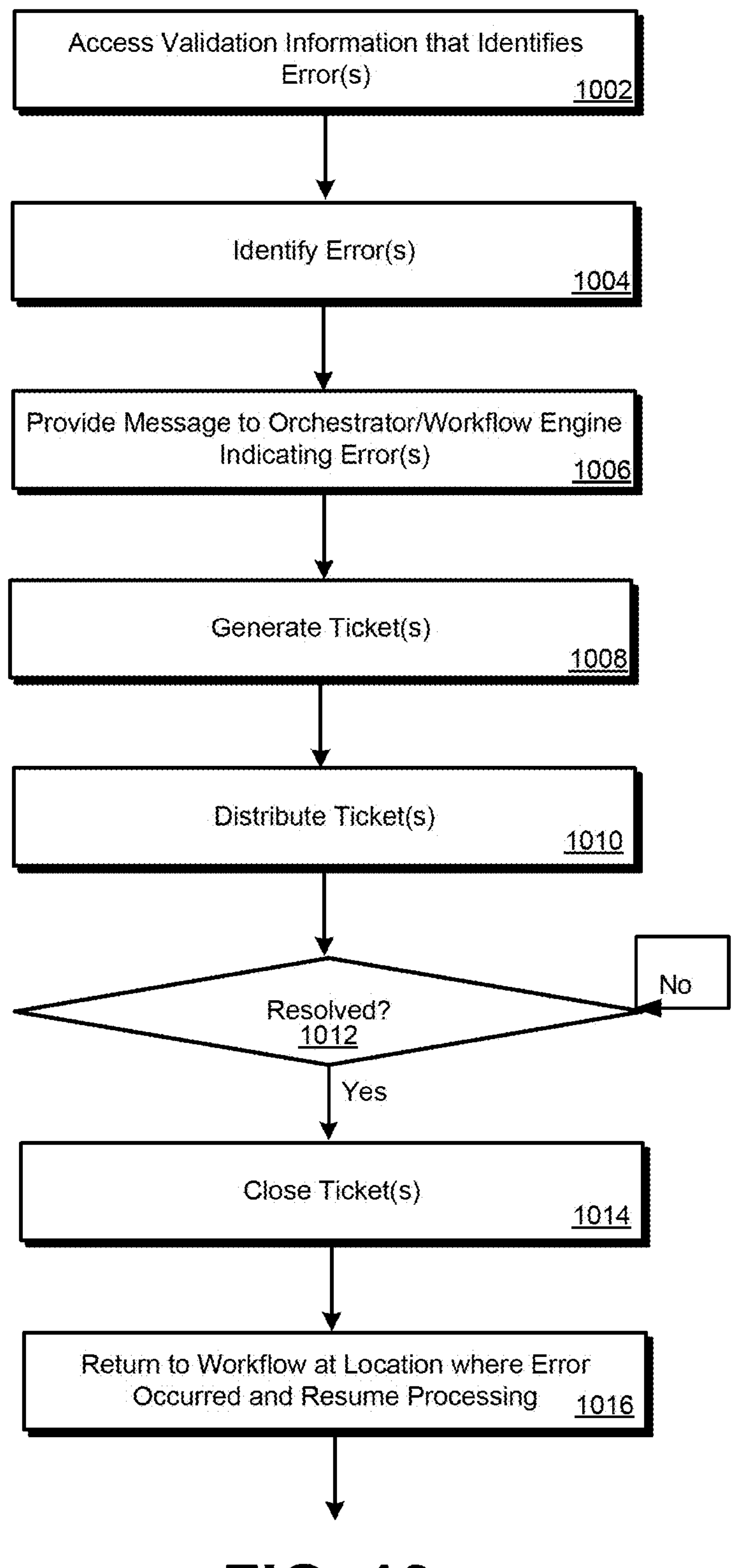
FIG. 10

```
conf t
lldp
interface GigabitEthernet0/0/0/2
mtu 9216
l2transport
no shut
l2vpn
bridge group TEST
bridge-domain TEST
description TEST
interface GigabitEthernet0/0/0/2
interface TenGigE0/0/0/13
no shut
interface TenGigE0/0/0/14
no shut
interface TenGigE0/0/0/15
no shut
interface TenGigE0/0/0/18
no shut
int TF0/0/0/24
no shut
commit
```

FIG. 17A

```
set NIC.NICConfig.1.INTEL_LLDPAgent
Enabled
set NIC.NICConfig.2.INTEL_LLDPAgent
Enabled
set NIC.NICConfig.3.INTEL_LLDPAgent
Enabled
set NIC.NICConfig.4.INTEL_LLDPAgent
Enabled
jobqueue create NIC.Slot.2-1
jobqueue create NIC.Slot.2-2
jobqueue create NIC.Slot.2-3
jobqueue create NIC.Slot.2-4 -r forced
```

FIG. 17B

```
set NIC.NICConfig.1.INTEL_LLDPAgent Disabled
set NIC.NICConfig.2.INTEL_LLDPAgent Disabled
set NIC.NICConfig.3.INTEL_LLDPAgent Disabled
set NIC.NICConfig.4.INTEL_LLDPAgent Disabled
jobqueue create NIC.Slot.2-1
jobqueue create NIC.Slot.2-2
jobqueue create NIC.Slot.2-3
jobqueue create NIC.Slot.2-4 -r forced
```

| CSR Port ID | CSR MAC Learning | IDRAC Port ID | IDRAC MAC Info | Port Match Status |
|---|---|---|---|---|
| Gi0/0/0/2 | 30d0.42db.c502 | iDRAC | 30:d0:42:db:c5:02 | MATCH |
| TenGigE0/0/0/13 | 40a6.b778.c4fc | NIC.Slot.2-1 | 40:A6:B7:78:C4:FC | MATCH |
| TenGigE0/0/0/14 | 40a6.b778.c4fe | NIC.Slot.2-3 | 40:A6:B7:78:C4:FE | MATCH |
| TenGigE0/0/0/15 | 40a6.b778.c4ff | NIC.Slot.2-4 | 40:A6:B7:78:C4:FF | MATCH |
| TenGigE0/0/0/18 | 30d0.42db.c508 | NIC.Embedded.1-1-1 | 30:D0:42:DB:C5:08 | MATCH |
| TwentyFiveGigE0/0/0/24 | 40a6.b778.c4fd | NIC.Slot.2-2 | 40:A6:B7:78:C4:FD | MATCH |
| CSR Software | | | | |

FALLOUT HANDLING FOR ZERO TOUCH PROVISIONING OF CELL SITES

BACKGROUND OF THE INVENTION

Zero-touch provisioning (ZTP) is a method of setting up devices that automatically configures the device using a switch feature. ZTP helps IT teams quickly deploy network devices, eliminating most of the manual labor involved with adding them to a network. ZTP can be found in devices and tools such as network switches, routers, wireless access points and firewalls. The goal of ZTP is to enable IT personnel and network operators to install networking devices without manual intervention. Manual configuration takes time and is prone to human error—especially if many devices must be configured at scale. ZTP is faster in this case, reduces the chance of error and ensures configuration consistency. ZTP can also be used to automate the system updating process.

Open Radio Access Network (O-RAN) is a concept based on interoperability and standardization of RAN elements including a unified interconnection standard for white-box hardware and open-source software elements from different vendors. Open RAN architecture integrates a modular base station software stack on off-the-shelf hardware which allows baseband and radio unit components from different suppliers to operate seamlessly together. O-RAN decouples hardware and software implementations allowing vendors (hardware, software, and systems) to focus on providing components rather than a complete. By disaggregating and splitting the RAN, O-RAN standardizes open and interoperable interfaces, and allows key functions to run as virtualized software functions on vendor-neutral hardware, an environment evolves where networks can be deployed with a more modular design. Validating that components are deployed successfully within the different stages for deploying an O-RAN network can be challenging. For example, it may require significant time and resources to validate components supplied by different vendors since the components may all implement different processes and procedures. Further, handling errors/issues that arise during execution of the different stages can be time consuming and challenging.

BRIEF SUMMARY OF THE INVENTION

In accordance with some embodiments of the present disclosure, a computer-implemented method is provided. In one example, the method includes causing, via one or more processors, a workflow to execute, wherein the workflow includes different stages that perform zero-touch provisioning associated with deployment of a cell site; accessing, via the one or more processors, validation data for a validation associated with a stage of the workflow; determining, via the one or more processors and based on the validation data, an occurrence of an error associated with the stage; determining, via the one or more processors, an identification of at least one of a responsible party, or a component, for resolving the error; generating, via the one or more processors, one or more tickets for the error; providing, via the one or more processors, the one or more tickets to a computing device associated with the at least one of the responsible party, or the component; determining, via the one or more processors, that the error is resolved; and causing the execution of the stage of the workflow to resume at a location prior to, or at a point in the stage of the workflow, where the error occurred. In another example, the method includes determining, via one or more processors, a type of fallout handling to perform for a physical device provisioned by a workflow that performs zero-touch provisioning associated with deployment of a cell site; accessing, via one or more processors, validation data for a validation of the physical device; determining, via the one or more processors and based on the validation data, an occurrence of an error associated with the physical device; generating, via the one or more processors, a ticket for the error; providing, via the one or more processors, the ticket to a computing device associated with a user responsible to resolve the error; and causing, via the one or more processors and based at least in part on the type of fallout handling to perform, an execution of the workflow to continue while the error remains unresolved, or the execution of the workflow to pause until the error is resolved.

In accordance with some embodiments of the present disclosure, a system is provided that includes an orchestrator, a validation engine, and a fallout engine to perform any one of the methods described in the present disclosure.

In accordance with some embodiments, the present disclosure also provides a non-transitory machine-readable storage medium encoded with instructions, the instructions executable to cause one or more electronic processors of a system to perform any one of the methods described in the present disclosure.

BRIEF DESCRIPTION OF THE DRAWINGS

FIG. 5 illustrates an example of a validation engine, in accordance with the present disclosure.

FIG. 10 illustrates a method for performing fallout handling, in accordance with the present disclosure.

FIG. 17A, FIG. 17B, and FIG. 17C illustrate exemplary script excerpts of a cabling verification program, in accordance with the present disclosure.

FIG. 18 illustrates an output of the method for cabling verification of a CSR and a server, in accordance with the present disclosure.

DETAILED DESCRIPTION OF THE INVENTION

Figure 1:
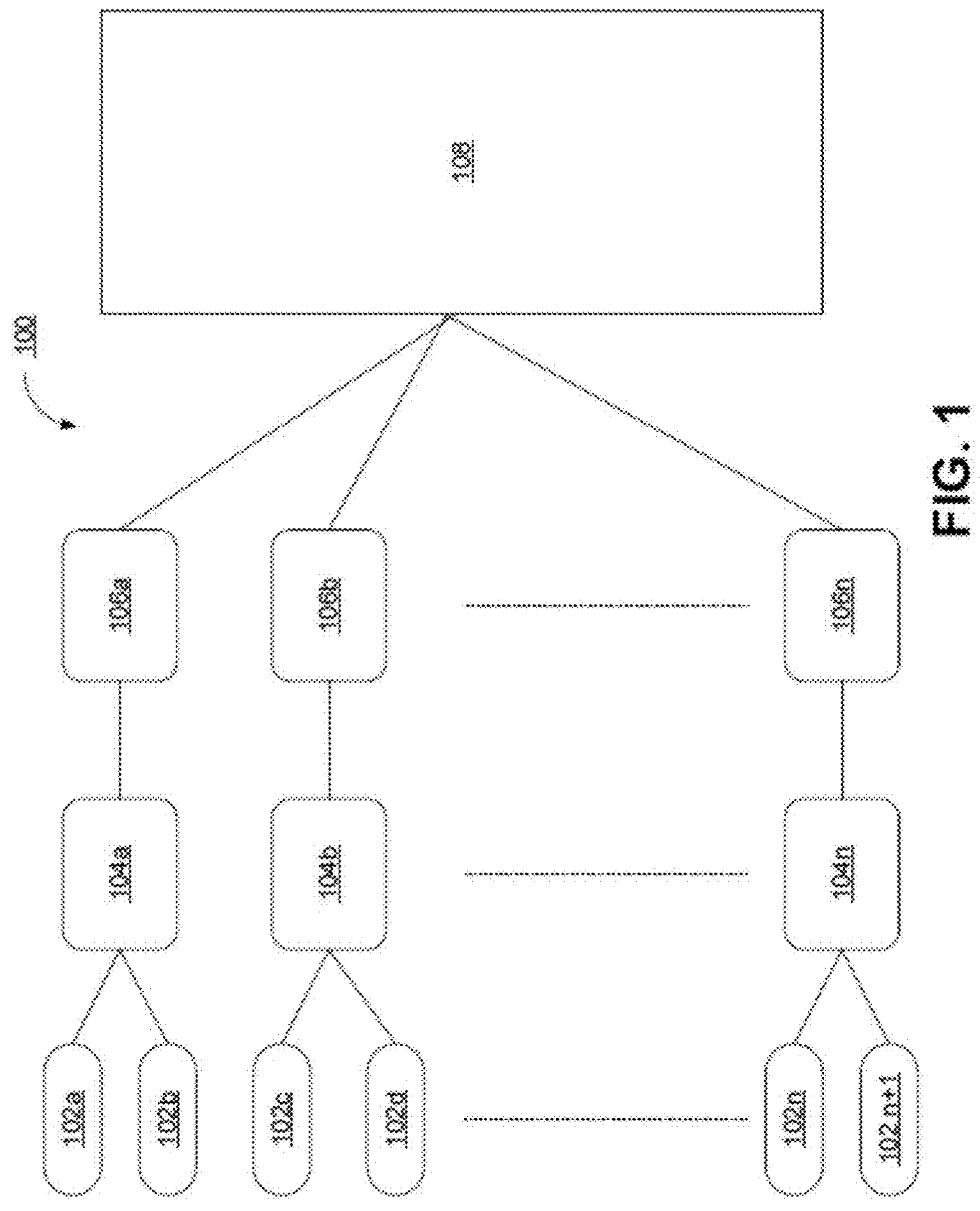
FIG. 1 generally illustrates an example system architecture of an O-RAN in which validation for ZTP operations are implemented, in accordance with the present disclosure.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Zero Touch Provisioning (ZTP) operations for cell sites rely on information regarding the cell sites being properly registered and updated in one or more systems to facilitate the ZTP operations. For example, for a cell site to be integrated into an overall network of a provider, certain information, such as identification of the cell site and one or more devices in the cell site, should be registered so that one or more network addresses can be assigned to the cell site.

Depending on a scope of the ZTP operations for the cell sites, various information can be checked and verified in the one or more systems facilitating the ZTP operations. It is desirable that results and/or any issues during the verification be addressed by a fallout handler to enable the appropriate operator to take measures to address the issues for the cell sites to function properly in the overall network.

One challenge in validation for ZTP operations in a network is that as the network scales, complexity of the validation grows. For example, in a 5G network, network services or functions are typically deployed in the core network, which may be implemented in one or more clouds. In the 5G network, hardware enables individual cell sites are typically deployed around edges of the 5G network. ZTP operations in the network, for example provisioning servers and/or devices in an individual cell site, typically various components within the network. For instance, various information regarding infrastructure in the individual cell sites should be registered and/or managed in an inventory database, information regarding network addressability of the cell sites should be managed in a network management database, workflow or procedure for provisioning the cell sites should be managed by a workflow management system, and so on. Thus, validation and fallout handling may be performed at different times, such as but not limited to prior to a cell site being provisioned, during provisioning, and/or performed after provisioning the cell site.

One insight provided by the present disclosure is that fallout handling for ZTP operations may be implemented into different stages of different workflows and in a front-end/back-end design. As used herein, "fallout" refers to an error/failure/issue (which may collectively be referred to herein as an "error" that occurs before, during, or after a workflow. A fallout may be any type of error that causes, or may cause, a process to not complete successfully. At a high level, scalability of the network is accommodated by a fallout engine and a validation engine in accordance with the present disclosure. In another aspect, the fallout engine and validation engine in accordance with the present disclosure facilitates a hybrid cloud network, where hardware and/or software from different vendors/manufacturers are provided. In the front-end/back-end design, validation tasks and fallout handling are divided into different flows. At the front-end, in some embodiments, containerized software are developed for different validation flows. For example, different validation and fallout flows can be developed for different types of network components, network functions, servers, devices, software. For example, different validation and fallout handling flows can be developed for different manufacturers/vendors. For example, different validation and fallout handling flows can be developed for validating different parts of a core network and/or different types of cell sites. In some embodiments, the containerized software is developed as Kubernetes apps deployed on one or more computing platforms.

At the back-end, validation workers can be developed to execute validation jobs generated by the front-end validation apps. The validation workers can be configured with intelligence to carry out the validation jobs in a specific manner. For example, different validation workers can be developed to execute validation jobs involving specific knowledge of different databases, servers, infrastructure and/or any other components facilitating ZTP operations. In this way, the validation of the ZTP operations in the core network, hybrid cloud, and/or across cell sites can be scaled.

One of the key benefits of Open RAN is how it powers innovation, and automation is a driver of this innovation. Cloud-native automation tools such as Continuous Integration/Continuous Delivery (CI/CD), Zero-Touch Provisioning (ZTP), Cloud Automation, Artificial Intelligence (AI) and Machine Learning (ML) enable the creation of agile, flexible, elastic, and efficient applications in modern, dynamic Open RAN environments. When automation becomes a key feature of an ALL G Open RAN solution, Mobile Network Operators (MNOs) reap the benefits of not only flexibility of choice and cost savings, but also the agility, scalability, ease of management and upgradeability that comes with the promise of a cloud-native Open RAN solution.

Automated Orchestration and Management is a key to benefit from a cloud-native Open RAN solution. Using techniques described herein, fallout handling assists the automated orchestration of ZTP of components within an O-RAN. For example, the fallout handling may be used to handle errors that occur during the automated orchestration and assist an orchestration component to control the execution of the workflows. Using these modern tools and technologies can provide several advantages and help at different stages of network deployment, from preparation to rollout of a new network or service, then operating and monitoring the network after roll-out. Automation and fallout handling is also important when it comes to termination or scaling down the network.

One insight provided by the present disclosure is the use of a fallout engine that performs fallout handling associated with errors that occur during ZTP workflows (which may also be referred to herein as "pipelines"). As discussed herein, each of the workflows may perform operations that automatically configure an O-RAN network (e.g., a 5G O-RAN). The ZTP workflows orchestrated by a workflow engine (e.g., an "orchestrator") can include various workflows for setting up devices in a core network of the O-RAN (e.g., within a cloud environment) as well as setting up devices in individual cell sites facilitating the O-RAN. In various examples, the fallout engine can identify errors at different times during each stage of a workflow, cause the errors to be addressed, and cause the workflow to restart. The fallout engine can be configured to handle fallouts for workflow, such as, but not limited to computer host provisioning (CHP) workflows, virtual server management provisioning (VSMP) workflows (e.g., VMware vCenter provisioning (VCP)), node-pool creation (NPC) workflows, distributed unit instantiation (DUI) workflows, radio access network (RAN) initiation workflows, and/or other workflows. According to some embodiments, the workflows may be completed in different stages, such as CHP pipeline before executing a VSMP workflow, and the like.

In some examples, the fallout engine identifies the occurrence of one or more errors that occur before, during, or after a stage such as a pre-check validation, a deployment validation (e.g., during an execution of operations of the stage), or a post-check validation after execution of the stage. The fallout engine is configured to receive an indication of an error, determine the appropriate action to remedy the error, and cause the ZTP workflow to stop and/or resume. In some configurations, the fallout engine causes a ticket to be generated that is automatically routed by a ticketing engine to the appropriate team/device. According to some examples, the fallout engine can provide fallout data to be displayed within a graphical user interface (GUI). For instance, the GUI may display information about the status of an error, what device(s) are affected by the error, and a resolution of the error. Instead of users having to manually identify what systems are involved in an error and who to assign the resolution of the error, the fallout engine automatically performs these operations.

In various examples, the fallout engine is used to manage fallouts for one or more of the workflows in deploying a cell site. In some embodiments, the fallout engine helps to ensure that any errors in operations performed in earlier stages are addressed before moving onto a later stage. For example, the fallout engine manages errors for setting up core functions/devices in the core network, such as IP assignment capability in the core network, before moving on to setting up individual cell sites. One advantage of this workflow lies in its scalability to incorporate a variety of vendors into the O-RAN. This workflow can be maintained by an operator/provider of the O-RAN—as opposed to having the vendors develop their own routines to bring their devices into the O-RAN. According to some examples, the fallout engine manages the fallouts during the different stages of setting up the O-RAN. This helps to allow faster deployment and lower costs establishing the ORAN.

Example O-RAN

Open radio access network ("O-RAN" herein) is a standard that allows a telecommunications network with all its functions, except necessary hardware components facilitating radio access, to be implemented in a cloud with automated deployment and operations. FIG. 1 generally illustrates an example system architecture of an O-RAN in which validation for ZTP operations are implemented in accordance with the present disclosure. It should be understood that the example system architecture shown in FIG. 1 is not particularly limited to a type of network-such as 4G or 5G. Although, some embodiments in the present disclosure are described and illustrated in the context of 5G, the example system architecture shown in FIG. 1 is intended to show a general environment in which technologies in accordance with the present disclosure can be applied. One skilled in the art will understand how to apply the technologies in accordance with the present disclosure to a network environment described by the example system architecture shown in FIG. 1.

As shown in FIG. 1, the example system architecture 100 of an O-RAN in accordance with the present disclosure comprises multiple cell sites, such as cell sites 102*a, b, c, d*, . . . , n, n+1. As illustrated in this example, within a given cell site, such as 102*a*, one or more radio units (RU) are installed in the O-RAN in accordance with the present disclosure. A given one of the RUs in the given cell site comprises hardware components such as radio frequency (RF) transceivers, antennas configured to transmit and receive RF signals from/to end user equipment (UE), such as smartphones. In various implementations, RUs in different cell sites in the example system architecture 100 can be provided by different hardware vendors. It is contemplated that in some embodiments, the cell sites in the example system architecture 100 are heterogenous in terms of hardware they are implemented in.

Also shown in FIG. 1 are distributed units (DUs) 104*a*, 104*b* . . . and 104*n*. A given one of the DUs, such as 104*a* in this example, is configured to facilitate real-time baseband processing function. Various protocols can be configured into the given DU, such as RLC, PDCP MAC and/or any other lower-level protocols. In various implementations, the given DU is configured to communicate with at least one RU in a cell site. For example, as shown in this example, the DU 104*a* is configured to communicate with the RUs in cell sites 102*a* and 102*b*, the DU 104*b* is configured to communicate with the RUs in cell sites 102*c* and 102*d*, and DU 104*n* is configured to communicated with the RUs in cell sites in 102*n* and 102*n*+1. It should be understood that the communications illustrated between the DUs and the cell sites in FIG. 1 are merely illustrative and thus should not be understood as limiting a scope of the O-RAN in accordance with the present disclosure. That is, the O-RAN in accordance with the present disclosure is not limited to one DU connected only to two cell sites as illustrated in FIG. 1. One skilled in the art understands that the O-RAN in accordance with the present disclosure can comprise a DU configured to however many cell sites.

A given communication link between a given DU and given RU in a cell site is typically referred to as a fronthaul haul—for example, the links between cell sites 102*a/b* and DU 104*a*. In that example, the DU 104*a* is configured to consolidate and process inbound traffic from RUs in the cell sites 102*a/b*, distributes traffic to the RUs in the cell sites 102*a/b*. In implementations, the DUs can be located near the cell sites they have communication with or centralized in a local data center provided by a vendor. In some implementations, various functionalities in the DUs can be implemented using software.

Still shown in FIG. 1 are centralized units (CUs), such as CU 106*a*, 106*b*, and 106*n*. A given one of the CUs is configured to handle higher layers of communication protocols as compared to a DU. For example, less time-sensitive packet processing, such as SDAP, RRC or PDCP, may be implemented in the given CU. It should be understood that functionality split between CU and DU is not intended to be specifically limited in the present disclosure. It is understood that such a split can be a design choice for a particular O-RAN. That is, the present disclosure should not be understood as being limited to a specific version or specific versions of O-RAN, where splits between CU and DU are specifically defined. For example, the DU can be co-located with the CU, or the DU can be bundled with the RU. The DU can also run standalone. Collectively, RUs, DUs, and a CU can create a gNodeB, which serves as a radio access network (RAN) of example system architecture 100.

In implementations, CUs in an O-RAN in accordance with the present disclosure can be implemented using software. In some embodiments, the given CU may be located in a data center provided by a third-party vendor. In some embodiments, one or more of the given CU can be located in the data center. The individual links between a CU and DU is typically referred to as a midhual link, for example the link between 104*a* and 106*a* shown in this example.

FIG. 1 also shows a core network 108. The core network 108 is configured to enable end users to access services such as phone calls, internet, etc. In various embodiments, the core network 108 is configured to handle operations such as subscriber location, profile, authentication, and/or any other operations. In those embodiments, such operations can facilitate the end users to employ communication technologies (such as 5G) through the example system architecture 100. In some embodiments, the services and/or operations provided by the core network 108 are implemented using software. Although only one core network 108 is shown in FIG. 1, this is not intended to be limiting. It should be understood the example system architecture 100 is not intended to be limited to 5G. It is understood embodiments provided herein can be applied to other types of cell sites when appropriate, such as LTE, 3G, 6G, WIFI or any other types of networks.

In various other examples, more than one core network 108 can be included in the O-RAN in accordance with the present disclosure. Links between a CU and the core network 108 are typically referred to as backhaul links, for example, the link between CU 106*a* and core network 108 shown in this example. The fronthaul links, midhaul links, and backhaul links shown in FIG. 1 may be collectively referred to as a transport layer for the example system architecture 100. In various embodiments, the transport layer is configured to handle end-to-end communication over the O-RAN in accordance with the present disclosure.

Figure 2:
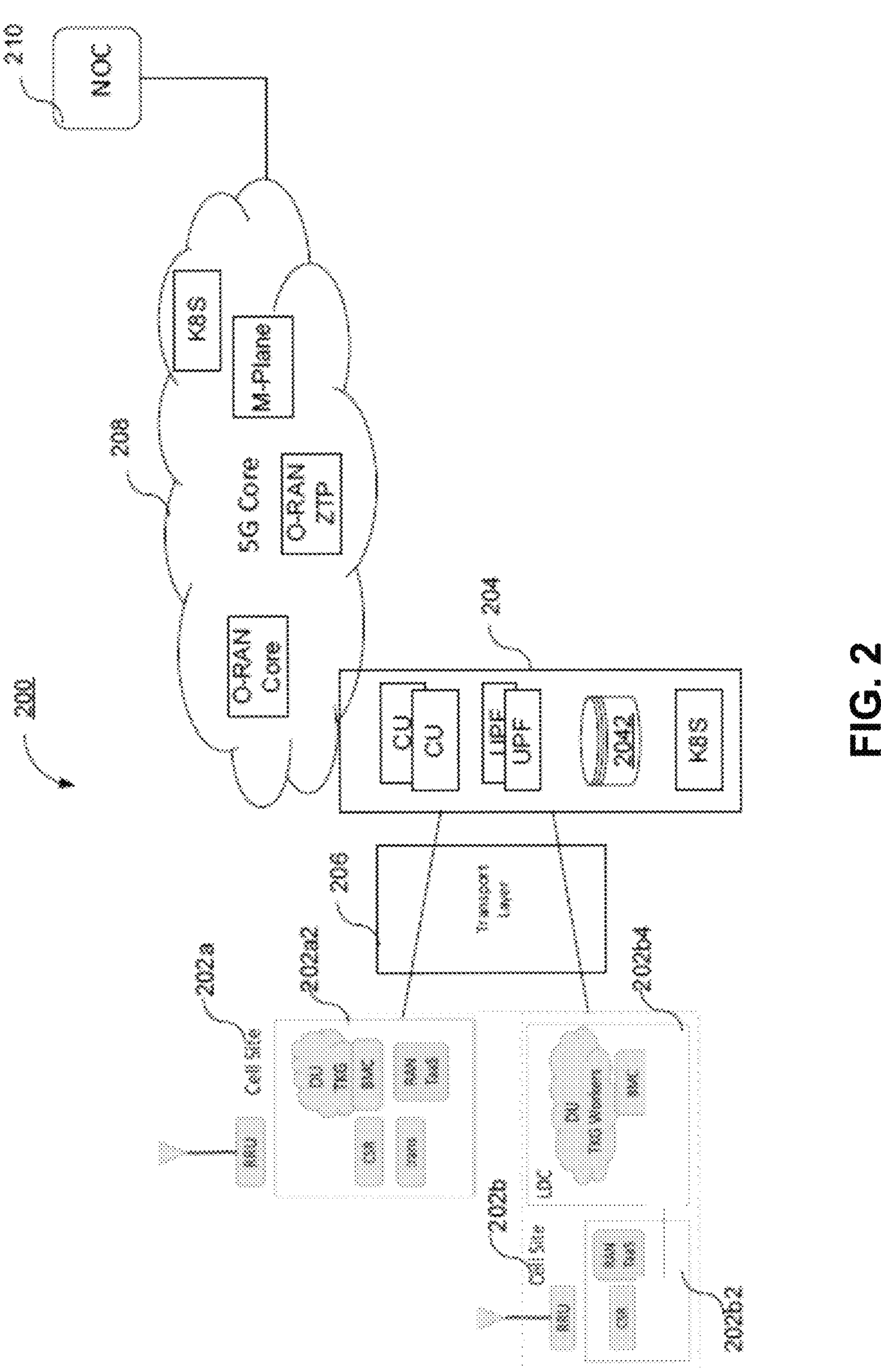
FIG. 2, illustrates a system architecture of a 5G O-RAN implemented in a cloud, in accordance with the present disclosure.

With an example system architecture 100 of O-RAN in accordance with the present disclosure having been generally described and illustrated, attention is now directed to FIG. 2, where an example system architecture 200 of a 5G O-RAN implement in a cloud is generally illustrated.

Example System Architecture of 5G O-RAN

As shown FIG. 2, the example system architecture 200 of a 5G O-RAN comprises a cell site 202*a*, a cell site 202*b*, and/or any other cell site(s). As shown, each of the cell site 202*a*, and 202*b*, in this example, includes a remote radio unit (RRU). In this example, one or more computing devices, located outside the cell site 202*a*, are configured to implement a cell site router (CSR), a DU, a baseband management controller (BMC), a RAN TaaS (test as a service), and/or any other components. In some embodiments, the computing device includes a processor configured to implement various components mentioned above. In one embodiment, the computing device(s) 202*a*2 includes an operating system such as a Linux system to implement these components. In that embodiment, the computing device(s) 202*a*2 is located in a cabinet within a proximity of the cell site 202*a*. In that embodiment, the cell site 202*a* is referred to as a "lite site".

The cell site 202*b* includes a computing device 202*b*2 and another computing device 202*b*4. In this example, the computing devices 202*b*2 and 202*b*4 are located within the cell site 202*b*. In one embodiment, the computing devices 202*b*2 and 202*b*4 are located in a cabinet within the cell site 202*b*. In that embodiment, the cell site 202*b* is referred to as a "dark site".

As shown, in this example, the computing device 202*b*2 is configured to implement the CSR, RAN TaaS, and/or any other components, while the computing device 202*b*4 is configured to implement the DU (for example, hosting Tanzu Kubernetes Grid (TKG)), BMC, and/or any other components. This is to show cell sites in a 5G O-RAN in accordance with the present disclosure can have computing devices located within the cell sites and configured to implement various components whose functionalities attributed to the DU, CSR or RAN TaaS. That is, the 5G O-RAN in accordance with the present disclosure is not intended to be limited such that DU and CSR/RAN TaaS are implemented on different computing devices, and/or outside the cell site. In some embodiments, the RAN TaaS for a specific cell site such as 202*a* or 202*b* can include tests designed to components and functionalities within the specific cell site, functionalities with another cell site (e.g., adjacency testing), and/or end-to tend testing.

In various embodiments, the RAN TaaS shown in this example is implemented using software and is configured to test and ensure one or more O-RAN components—e.g., the RRU or CSR, in the cell sites are performing in compliance with O-RAN standards. Various tests or test suites can be configured into RAN TaaS to cause target components in the cell sites to be run under preset test conditions. A goal of such a test or test suite in the RAN TaaS is to verify that individual components in the cell sites can handle expected traffic and functionality. In some embodiments, tests in the RAN TaaS are run continuously on a preset or configured frequency to ensure the above-mentioned types of testing of the specific cell sites are in compliance with the O-RAN standards continuously.

As shown FIG. 2, the cell sites 202*a* and 202*b* are connected, via the transport layer 206, to a data center 204 configured to host one or more CUs, and one or more UPFs (user plane functions) implementing at least one user plane layer, and/or any other components. In one embodiment, the data center 204 is referred to as a breakout edge data center (BEDC). In general, the data center 204 is configured to accommodate the distributed nature of various functions in the example system architecture 200 of a 5G O-RAN. In that embodiment, the BEDC hosts various 5G network functions (NFs) that have low latency requirement. In that embodiment, the BEDC provides internet peering for general 5G service and enterprise customer-specific private network service.

Shown in this example is a storage 2042 configured to store various (Cloud-native Network Functions) CNFs and artifacts for facilitating implementations of the DUs and CUs in the example system architecture 200 of the 5G O-RAN. Examples of the storage 2042 can include Amazon S3, GitHub, Harbor and/or any other storage services.

In some embodiments, such as shown in FIG. 2, the data center 204 can include one or more Kubernetes (also known as K8S) configured to facilitate automation of deployment, scaling, and management of various software/applications deployed within the data center 204 and/or within one or more cell sites operatively communicating with the data center 204 through the transport layer 206.

5G Core 208 can be implemented such that it is physically distributed across data centers or located at a central national data center (NDC) and/or regional data center (RDC). In this example, 5G core 208 performs various core functions of the 5G network. In implementations, 5G core 208 can include an O-RAN core implementing various 5G services and/or functions such as: network resource management components; policy management components; subscriber management components; packet control components; and/or any other 5G functions or services. Individual components may communicate on a bus, thus allowing various components of 5G core 208 to communicate with each other directly. Implementations 5G core 208 can involve additional other components.

Network resource management components can include: Network Repository Function (NRF) and Network Slice Selection Function (NSSF). NRF can allow 5G network functions (NFs) to register and discover each other via a standards-based application programming interface (API). NSSF can be used by AMF to assist with the selection of a network slice that will serve a particular UE.

Policy management components can include: Charging Function (CHF) and Policy Control Function (PCF). CHF allows charging services to be offered to authorized network functions. A converged online and offline charging can be supported. PCF allows for policy control functions and the related 5G signaling interfaces to be supported.

Subscriber management components can include: Unified Data Management (UDM) and Authentication Server Function (AUSF). UDM can allow for generation of authentication vectors, user identification handling, NF registration management, and retrieval of UE individual subscription data for slice selection. AUSF performs authentication with UE.

Packet control components can include: Access and Mobility Management Function (AMF) and Session Management Function (SMF). AMF can receive connection and session related information from UE and is responsible for handling connection and mobility management tasks. SMF is responsible for interacting with the decoupled data plane, creating updating and removing Protocol Data Unit (PDU) sessions, and managing session context with the User Plane Function (UPF).

In one O-RAN implementation, DUs, CUs, 5G core 208 and/or any other components in that O-RAN, is implemented virtually as software being executed by general-purpose computing equipment, such as those in one or more data centers. Therefore, depending on needs, the functionality of a DU, CU, and/or 5G 208 core may be implemented locally to each other and/or specific functions of any given component can be performed by physically separated server systems (e.g., at different server farms). For example, some functions of a CU may be located at a same server facility as where the DU is executed, while other functions are executed at a separate server system. In some embodiments, DUs may be partially or fully added to cloud-based cellular network components. Such cloud-based cellular network components may be executed as specialized software executed by underlying general-purpose computer servers. Cloud-based cellular network components may be executed on a third-party cloud-based computing platform. For instance, a separate entity that provides a cloud-based computing platform may have the ability to devote additional hardware resources to cloud-based cellular network components or implement additional instances of such components when requested.

In implementations, Kubernetes (K8S), or some other container orchestration platform, can be used to create and destroy the logical DU, CU, 5G core units and subunits as needed for the O-RAN to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

In implementations, the deployment, scaling, and management of such virtualized components can be managed by an orchestrator (such as Kubernetes) in the 5G core 208. The orchestrator can trigger various software processes executed by underlying computer hardware. In implementations, the one or more management functions (managing the 5G core 208, and/or the example system architecture 200 in general) can be implemented in the 5G core 208, for example through a M-Plane. The M-Plane can be configured to facilitate monitoring of O-RAN and determining the amount and location at which cellular network functions should be deployed to meet or attempt to meet service level agreements (SLAs) across slices of the cellular network.

In various implementations, the orchestrator can allow for the instantiation of new cloud-based components of the example system architecture 200 of the 5G O-RAN. As an example, to instantiate a new DU, the orchestrator can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

In some implementations, a network slice functions as a virtual network operating on example system architecture 200 of the 5G O-RAN. In those implementations, example system architecture 200 of the 5G O-RAN is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at a given RU and a given DU, a second set of network slices, which may only partially overlap or may be wholly different than the first set, may be reserved at the given RU and the given DU.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

In some embodiments, the 5G core 208 implements a O-RAN ZTP (zero touch provisioning) layer. In general, in those embodiments, the O-RAN ZTP layer is configured to facilitate automation of the deployment workflow within the example system architecture 200 of the 5G O-RAN. ZTP is commonly known as automated deployment of software (new or updates) to various components in a system with as little human intervention as possible. In the context of example system architecture 200 of the 5G O-RAN, ZTP means automated deployment of software (new or updates) to hardware and/or software components such as RUs, CSRs, DUs, CUs, and various modules in the 5G core 208 with little human intervention. For example, without an engineer having to be present at a specific cell site such as 202*a* or 202*b*, O-RAN ZTP can facilitate automatic update of a DU with the latest DU software. It should be understood the O-RAN ZTP layer is referred to a set of components that work together to facilitate automatic deployment of software in the example system architecture 200 of the 5G O-RAN with little human intervention. Thus, although, the O-RAN ZTP layer is shown being implemented in the 5G core 208 in FIG. 2, it is merely illustrative. That is, the O-RAN ZTP in accordance with the present disclosure is not intended to be limited to components implemented a core of the O-RAN in accordance with the present disclosure. In some other examples, one or more components of the O-RAN ZTP can be implemented in, for example, CUs or DUs in the O-RAN in accordance with the present disclosure. For instance, as will be described below, adaptors configured to communicate with devices or components of different vendors for ZTP operations can be implemented in CUs or DUs.

Also shown in FIG. 2 is a NOC 210 (Network Operation Center). In some embodiments, the NOC 210 is implemented on a general-purpose computing device. In those embodiments, one or more interfaces are implemented in the NOC 210. In those embodiments, the interfaces represent virtual dashboards that can facilitate automatic deployment of software to various components in the example system architecture 200 of the 5G O-RAN. For instance, an interface is provided in the NOC 210 to enable an operator to set a schedule to update one or more network services in the 5G core 208. As another illustration, an interface is provided in the NOC 210 to enable the operator to push software to a specific component in a cell site (such as 202*a* or 202*b*) or in a data center (such as 204) to configure or update the component. One or more requests can be generated by the NOC 210 to instigate the deployment of the software as scheduled or intended by the operator. The request(s) can be received by the O-RAN ZTP layer, which in turn can generate one or more commands to deploy the software to the component. Although one NOC 210 is shown in this example, this is not intended to be limiting. More than one NOCs are typically deployed in the example system architecture 200 of the 5G O-RAN. In some implementations, a given NOC may be provided by a vendor to the 5G O-RAN. For instance, the vendor may be a software develop that provides components or services to the example system architecture 200 of a 5G O-RAN. In that instance, the given NOC is a computing device or system on a premise of the software developer.

Components such as DUs, CUs, the orchestrator, O-RAN ZTP layer, interfaces in the NOC 210, and/or any other components in the 5G core 208 may include various software components communicating with each other, handling large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Example System to Facilitate Validation and Fallout Handling for ZTP Operations

Figure 3A:
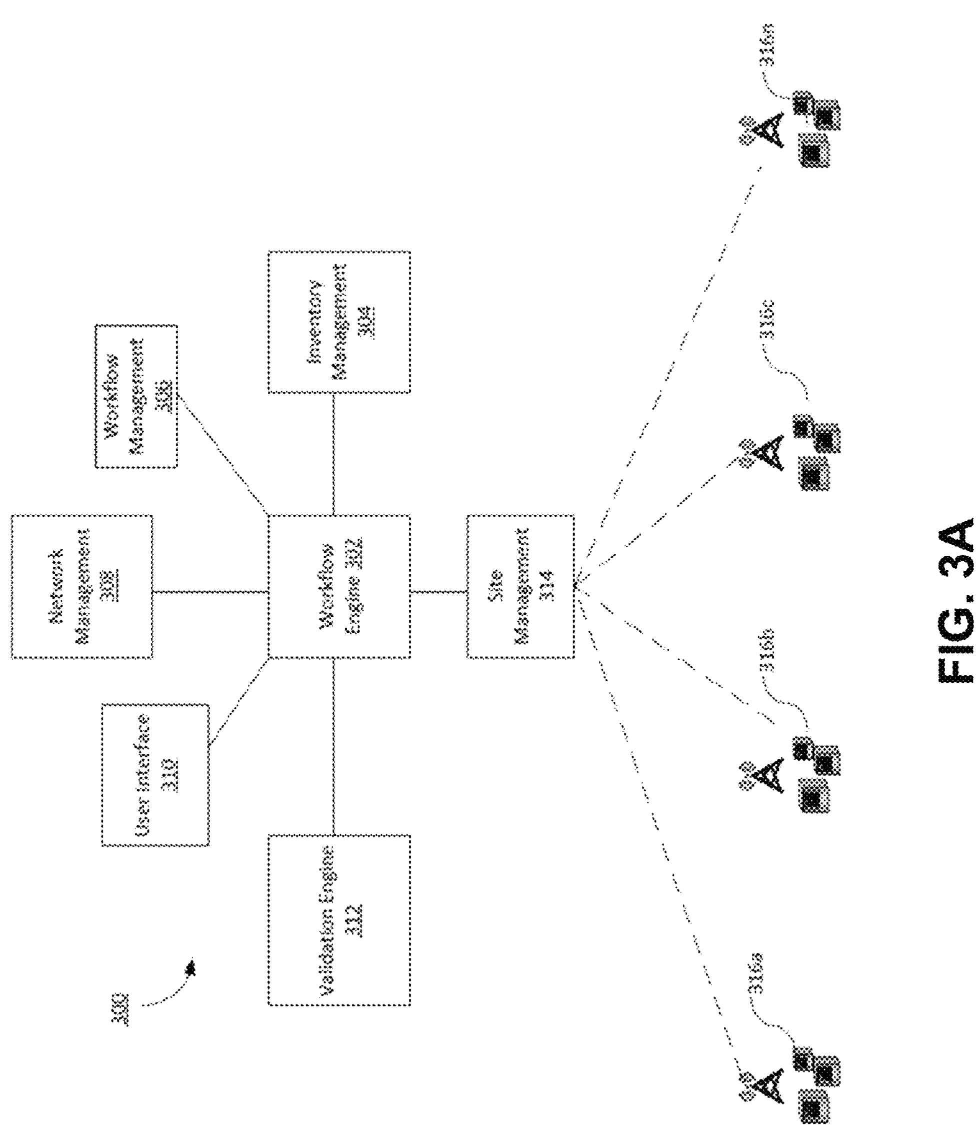
FIG. 3A illustrates an example system that can facilitate validation for ZTP operations within a telecommunication network, in accordance with the present disclosure.

FIG. 3A illustrates an example system 300 that can facilitate validation for ZTP operations within a telecommunication network, such as the one shown in FIG. 1 or FIG. 2, in accordance with some embodiments. In this example, the system 300 includes a site management component 314, an inventory management component 304, a workflow engine 302, a workflow management component 306, a network management component 308, a user interface 310, a validation engine 312, and/or any other components. As also shown, the various components in the example system 300 are operable to communicate with individual cell sites 316*a*, 316*b*, 316*c*, 316*n*.

In various embodiments, the site management component 314 is configured to manage hardware and/or software deployed at each individual cell site, for example 316*a*, 316*b*, 316*c*, 316*n*. In some embodiments, the site management component 314 is configured to configure hardware on individual cell sites according to instructions provided to the site management component 314. In some embodiments, the site management component 314 is configured to boot strap network devices, upgrade network operating system (NOS), and configure VLANS across the individual cell sites. In some embodiments, the site management component 314 is configured to connect servers or hosts via selected network topology across the individual cell sites. In some embodiments, the site management component 314 is configured to deploy virtual infrastructure management (VIM) into a workload-ready state. In some embodiments, the site management component 314 comprises a bare metal orchestrator (BMO) provided by Dell.

In various embodiments, the site management component 314 is configured to manage and/or distribute workloads and/or data to individual cell sites. In some embodiments, the site management component 314 is configured to onboard, view, and manage a virtual infrastructure across the individual cell sites. In some embodiments, the site management component 314 comprises Telco Cloud Automation (TCA) orchestrator provided by VMWare.

In various embodiments, the inventory management component 304 is configured to facilitate dynamic network inventory for one or more networks provided by the individual cell sites. In some embodiments, the inventory management component 304 provides a comprehensive, end-to-end view of the resources to plan the deployment of new infrastructure for the individual cell sites and as well as to manage capacity. This facilitates delivering dynamic services like 5G, including network slicing. In some embodiments, the inventory management component 304 is configured to provide a unified, dynamic view of hybrid resources and services across multiple domains to streamline operations and reduce complexity. In those embodiments, the inventory management component 304 provides auto-discovery and federation capabilities using graph database technology to model and visualize complex, dynamic networks, enabling automated workflows, such as the ZTP workflows. In some embodiments, the inventory management component 304 comprises a Blue Planet Inventory (BPI) system provided by Blueplanet.

In various embodiments, the workflow engine 302 is configured to facilitate ZTP operations to be carried out across the cell sites and/or on a core network. The workflow may involve automating one or more jobs to set up and/or verify one or more components on the core network to be ready for deploying network functionalities on the core network. The workflow may involve setting up one or more servers on the core network and/or in the individual cell sites for cell site deployment. The workflow may involve pushing software to update one or more components in the cell sites, and/or any other operations. In various embodiments, the workflow engine 302 comprises a Cisco Business Process Automation Service (BPA).

In various embodiments, the workflow management component 306 is configured to manage one or more workflow to be carried out by the workflow engine 302. The workflow management by the workflow management component 306 may involve managing a workflow for configuring one or more servers on the core network, one or more distributed units (DU) in the core network, one or more radio access network (RAN) in the individual cell sites, one or more virtual clusters in the core network, one or more network functions in the core network, and/or any other workflows.

In various embodiments, the network management component 306 is configured to manage one or more network components and/or devices on a core network. The network management may involve managing and identifying devices connected to the core network—for example, for the Domain Name System (DNS), Dynamic Host Configuration Protocol (DHCP), IP address management (collectively, "DDI"), and/or any other services. The network management may involve reserving and/or assigning one or more internet/intranet addresses for one or more components in the core network and/or individual cell sites. In various embodiments, the network management component comprises a system provided by Infoblox.

In various embodiments, the user interface 310 is provided to facilitate a user to monitor a progress of the ZTP operations facilitated by the workflow engine 302, verify one or more results of the workflow managed by the workflow management component 306, check one or more statuses of individual cell sites, check a status of a network function on the core network, and/or any other services. In various embodiments, the user interface 310 includes a graphical user interface (GUI) depicting a success/failure of a ZTP operation or workflow carried out to an individual cell sites, and/or whether or there is an issue with the ZTP operation and/or the workflow.

The validation engine 312 is configured to perform one or more validation tasks for the ZTP operations facilitated by the workflow engine 302. The validation may involve validating whether one or more servers are ready on the core network for deploying individual cell sites, validating whether one or more DU/RAN are deployable before their deployment, validating operations performed during deployment, and/or validating whether they are ready after their deployment.

Figure 3B:
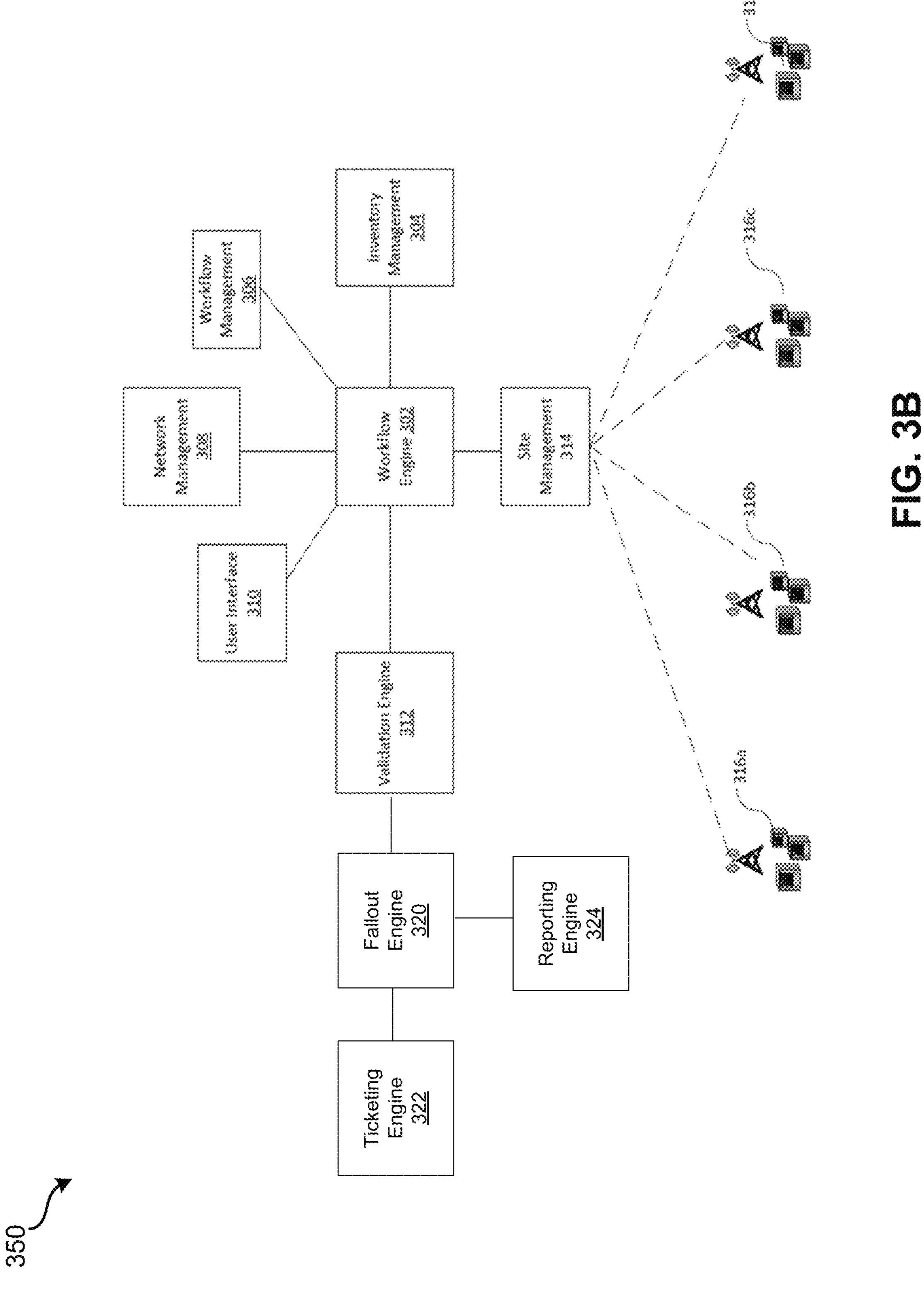
FIG. 3B illustrates an example system that can facilitate validation, and fallout handling, for ZTP operations within a telecommunication network, in accordance with the present disclosure.

Turning now to FIG. 3B, an example system 350 that can facilitate validation, and fallout handling, for ZTP operations within a telecommunication network is illustrated. FIG. 3B is similar to FIG. 3A but includes additional components, such as fallout engine 320, ticketing engine 322, and reporting engine 324.

As briefly discussed above, the fallout engine 320 handles fallouts associated with errors that occur during the ZTP workflows that perform operations for automatically configuring an O-RAN network (e.g., a 5G O-RAN). In some examples, the validation engine 312 performs validations at different times within the ZTP workflows orchestrated by a workflow component (e.g., an "orchestrator"), such as the workflow management 306 or the workflow engine 306.

In various examples, the fallout engine 320 can identify errors, detected by the validation engine 312, that occur at different times during each stage of a workflow, cause the errors to be addressed, and cause the workflow to pause/restart. According to some configurations, the fallout engine 320 can be configured to handle fallouts for workflows, such as, but not limited to computer host provisioning (CHP) workflows, virtual server management provisioning (VSMP) workflows (e.g., VMware vCenter provisioning (VCP)), node-pool creation (NPC) workflows, distributed unit instantiation (DUI) workflows, radio access network (RAN) initiation workflows, and/or other workflows. According to some embodiments, the workflows may be completed in different stages, such as the CHP workflow, before executing a VCP workflow, before executing an NPC workflow, before executing a DUI workflow, and before executing the RAN initiation workflow.

In some examples, the fallout engine 320 identifies the occurrence of one or more errors at one or more times (e.g., errors that occur during a stage pre-check, during the execution/deployment/provisioning of the stage, or a post-check after execution of the stage). The fallout engine 320 is configured to access validation data generated by the validation engine 312 to identify an occurrence of an error, determine the appropriate action to remedy the error, and cause the workflow to be paused/restarted/resumed at the point of the error, or at a time before the error. As discussed in more detail below, the fallout engine 320 may cause the workflow to pause/stop until an error is resolved (e.g., a hard fallout), or may continue the workflow while the error is being resolved (e.g., a soft fallout). As an example, the fallout engine 320 may allow the workflow to continue when there is at least one RU that was validated, even though the workflow specifies more RUs. When there is not a validated RU, then the fallout engine 320 may stop the workflow until at least one RU is validated. In some configurations, the fallout engine 320 causes a ticket to be generated by the ticketing engine 322.

In various embodiments, the fallout engine 320 communicates with a ticketing engine 322 to perform ticketing actions. The ticket has a number of parameters and other information to identify one or more errors (e.g., issues/problems/symptoms). The ticket may then be provided to a computing device associated with a user that is responsible for resolving the error. In other examples, the ticket may be automatically handled by one or more devices/components. For example, a system may receive the ticket that performs one or more automated actions in an attempt to resolve the ticket (e.g., reboot a device, . . . ). In some examples, the fallout engine 320 assigns the ticket to a particular technician or department for handling, providing more information in the ticket, assigning the ticket to a category, giving the ticket a priority, a timeline to be completed, one or more contacts for the ticket, and/or any other aspects. In various embodiment, the ticketing system is provided by Service Now (SNOW).

According to some examples, the fallout engine 320 generates fallout data that can be displayed by the reporting engine 324. In some configurations, the reporting engine 324 causes the fallout data to be displayed within a graphical user interface (GUI). For instance, the GUI may display information about the status of an error, what device(s) are affected by the error, who the responsible party is to resolve the error, and a resolution of the error. Instead of users having to manually identify what systems are involved in an error and who to assign the resolution of the error, the fallout engine automatically performs these operations. In various examples, the fallout engine 320 helps to ensure that any errors in operations performed in earlier stages are addressed before moving onto a later stage.

Figure 4:
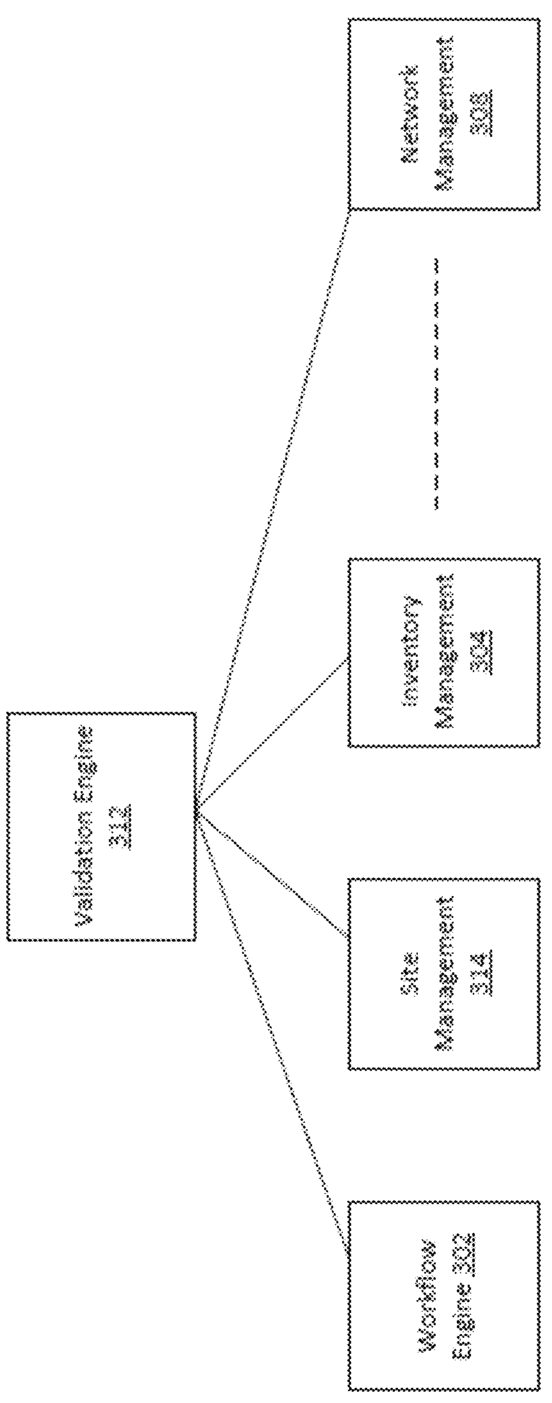
FIG. 4 illustrates components associated with ZTPO validations, in accordance with the present disclosure.

With the example systems 300 and 350 having been generally described, attention is now directed to FIG. 4, where components shown in FIG. 3A is illustrated for describing ZTP validations. One insight provided by the present disclosure is that various validations (or checks) may be performed at various stages and/or timing during a ZTP operation or a workflow. In some examples, validations and fallout handling can be performed at different times during a stage. According to some configurations, a pre-check validation, a stage validation, and a post-check validation is performed for each stage. In other examples, more or fewer checks can be performed.

In some examples, checks/validations are performed for workflows associated with computer host provisioning (CHP) workflows, virtual server management provisioning (VSMP) workflows (e.g., VMware vCenter provisioning (VCP)), node-pool creation (NPC) workflows, distributed unit instantiation (DUI) workflows, radio access network (RAN) initiation workflows, and/or other workflows For instance, for a CHP workflow, checks may be performed to ensure that data is ready for a CHP. As used herein, CHP may be referred to as provisioning a hardware server. For instance, individual CHPs available for the core network may be provided by different manufacturer such that the core network may be regarded as a hybrid cloud network. In that instance, provisioning a particular CHP may involve following provisioning procedures for that CHP as provided by a manufacturer of that CHP.

In that instance, a validation according to the provisioning procedures for that CHP may be performed as part of a Pre-CHP provisioning for that CHP. In various embodiments, this validation may involve collecting data from the workflow engine 302, the network management component 308, the site management component 314, the inventory management component 304, and/or any other components as shown in FIG. 2. For instance, for setting the particular CHP, information regarding the CHP should be ready in the network management component, one or more software should be ready in the inventory management component for deployment for that CHP, and/or any other checks.

In various embodiments, different validation flows may be implemented for different ZTP operations and/or ZTP workflow. As mentioned above, in various embodiments, pre-CHP and post-CHP validation flows are implemented to facilitate CHP on the core network and/or in the individual cell sites. In various embodiments, a pre-site management component and post site management component validation flows are implemented to facilitate site management component provisioning in the example system 100. In various embodiments, a post cloud service router (CSR) validation is performed to facilitate CSR provisioning. As used herein, a CSR may be referred to one or more components enabling routing, VPN, Firewall, High-Availability, IP SLA, AVC, WAN Opt, and/or any other network services on the core network and/or in the individual cell sites. In various embodiments, a post DU and a port RAN validation are performed to facilitate DU and RAN provisioning.

Figure 5:
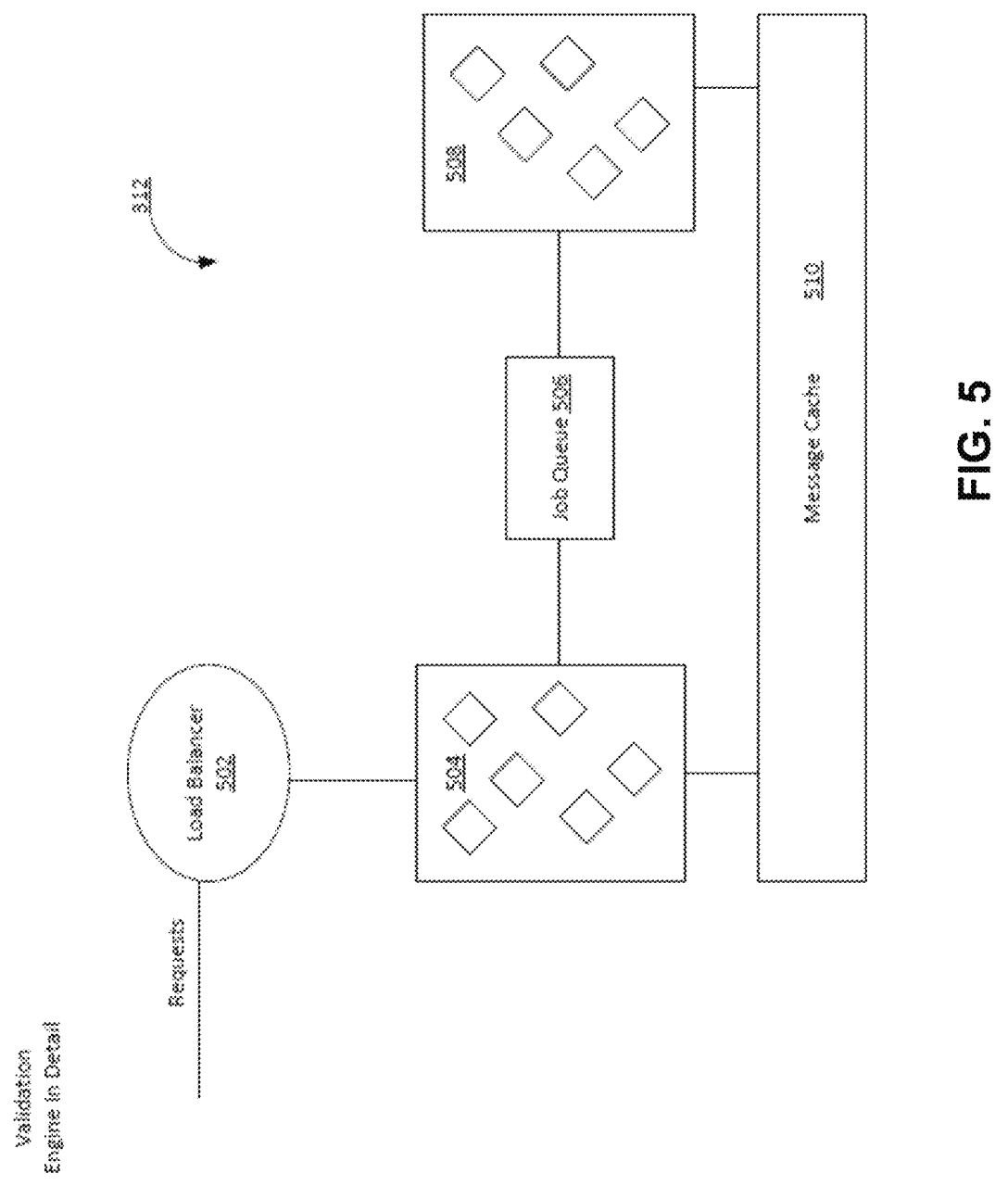

FIG. 5 illustrates an example of a validation engine 312 shown in FIG. 3. In this example, the validation engine 312 comprises a load balancer 502, one or more validation apps 504, one more validation workers 508, a job queue 506, a message cache 510, and/or any other components. It should be understood, the validation engine 312 may be implemented as software, hardware and/or a mixture of both in various embodiments. It should also be understood, although various components shown in this example as being part of the validation component, they are not shown to limit the validation component. Other structures of the validation component are contemplated. For example, a unified data store may be employed in other examples rather than the job queue and the message cache shown in this example.

In this example, the load balancer 502 is configured to receive a request to perform a validation. As mentioned, the requested validation may facilitate a ZTP operation and/or a ZTP workflow to be performed. This request may be for a pre operation/workflow, such as a Pre-CHP described above, and/or for a post operation/workflow such as a post-CSR described above. In this example, the load balancer 502 is configured to distribute the requested validation to one or more workflow apps 504 to be carried out.

In this example, an individual workflow app 504 is a node configured to run containerized applications. As mentioned, ZTP validations on the core network and/or across the individual cell sites may involve different types of validation flows—e.g., pre-CHP, post-CHP, pre-VCP, post-VCP, pre-NPC, post-NPC, pre-DUI, post-DUI, pre-RAN, post-RAN, pre-CSR, post-CSR, and/or any other validation flows. One insight provided by the present disclosure is that ZTP validations for the core network and/or across the individual cell sites may be implemented as individual apps—e.g., one for pre-CHP, one for post CHP, one for CSR, one for DU, one for RAN, and/or any other apps. In some examples, the individual apps may be provided by different vendors. For instance, one vendor may provide an app for validation of one or more workflows, another vendor for another workflow(s), and yet other vendors for different workflows and/or validation of different operations within a workflow. It has also been observed that certain validation flows may involve more amount of time to be completed than another. For example, a post CHP validation may involve more time for completion than a post DU. Still another insight is that certain validation flows may be performed in parallel, for example a post DU validation may be performed in parallel after multiple DUs are provisioned.

In this example, according to these insights, the load balancer 502 is configured to distribute the requested validation to individual validation apps 504 to be completed. For instance, the request may involve validating DU provisioning for multiple DUs after they are deployed. In that instance, the load balancer 502 is configured to distribute the DU validations to individual validation apps 504 so the DU validations are performed in parallel. As another example, the request may involve a post-CHP validation. The load balancer 502 in that instance is configured to break down the post-CHP validation into different pieces according to available validation apps and distribute the pieces to those validation apps to be completed.

In various embodiments, different validation flows or pipelines are developed as validation apps 504. In one embodiment, the validation apps are developed as Kubernetes clusters. In that embodiment, the load balancer 502 is configured to identify a particular Kubernetes cluster or multiple particular Kubernetes clusters are available for completing the requested validation, to break down the requested validation into pieces according to the identified Kubernetes cluster(s) and distribute the pieces to the identified Kubernetes cluster(s) for execution, and/or perform any other services.

An individual validation app 504 is configured to generate one or more validation jobs/tasks according to an input it receives. For example, a pre-CHP validation app, upon receiving a request to validate data readiness for provisioning a particular computer host, may generate multiple jobs, e.g., one for validating data from the network management component, one for validating data from the inventory management component, one for validating data from the workflow engine, and/or any other jobs. In various examples, the CHP validation app is configured to place the jobs onto the job queue so that they can be completed by the validation workers. In various embodiments, the job queue is implemented using a database, an in-memory data structure, a cache, such as redis queue (RQ), and/or any other types of data store.

The individual validation workers 508 are configured to pick up jobs/tasks in the job queue and complete the jobs/tasks. In various embodiments, this may involve communicating with different components in the example system 100, the core network, and/or any other components. For instance, a pre-CHP job may involve collecting data from the network management component to validate whether data for provisioning a particular CHP (such as an IP address for example) is reserved in the network management component for the CHP. In that example, the individual validation worker is configured to communicate with the network management component, provide the network management component specific information regarding that CHP, and receive network management information regarding that CHP from the network management component.

In various embodiments, as in this embodiment, the individual validation workers 508 are configured to place a validation result/status in the message queue. For example, the individual validation worker 508 handling the pre-CHP validation job is enabled to place a validation result (e.g., pass or fail), a status (e.g., validation to be started, in progress, and/or completed), information regarding one or more issues discovered by the validation (e.g., no IP address assigned to the particular CHP), and/or any other information in the message queue.

In various embodiments, the message queue/cache 510 is configured to store a predetermined amount of messages, for example a certain number of messages or messages within certain amount of time. In one embodiment, the message queue 510 is configured to store messages generated within the past 30 minutes. In various embodiments, the individual validation apps 504 are configured to pick up messages for the jobs they placed in the job queue 506. In those embodiments, the individual validation apps 504 are configured to generate information according to the messages and transmit the information to the user interface for display. For example, without limitation, the pre-CHP job mentioned above may generate one or more messages indicating that 40% of the job is completed while the other 60% is still in progress, and that there are 3 issues found in the 40% completion. According to this, the individual validation app is configured to generate information so that the user interface can display it to the user for attention to those issues.

Figures 6A, 6B:
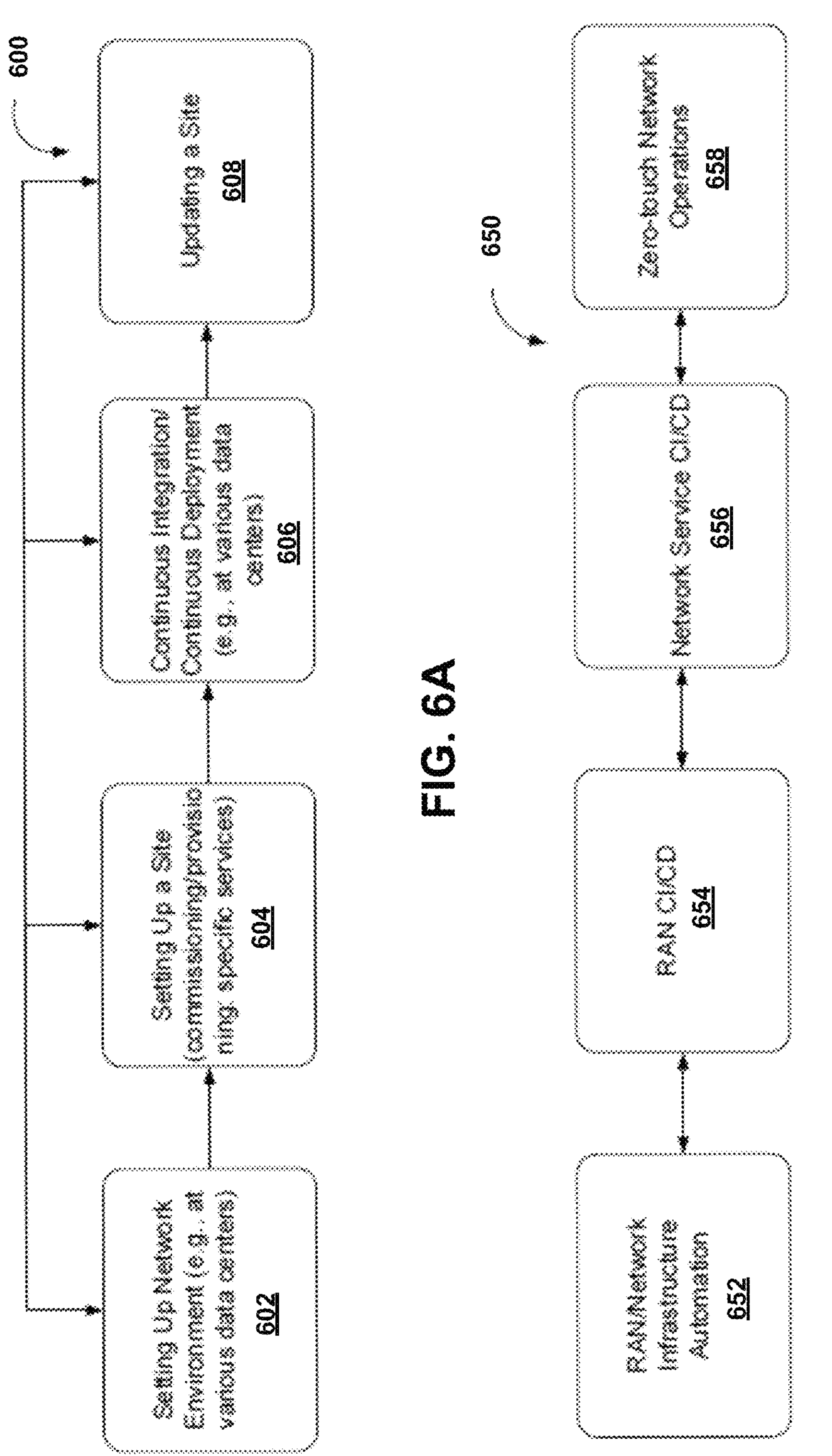
FIG. 6A illustrates an example process for setting up, provisioning, and operating a O-RAN, in accordance with the present disclosure.
FIG. 6B illustrates another example process showing how ZTP is facilitated in an O-RAN, in accordance with the present disclosure.

FIG. 6A illustrates an example process 600 for setting up, provisioning, and operating a O-RAN such as the example system architecture 200 of the 5G O-RAN shown in FIG. 2. In the process 600, O-RAN ZTP technologies are employed to facilitate each step in the process 600. According to some configurations, a ZTP orchestrator (ZTPO) such as workflow engine 302 and/or workflow management component 306 manages different ZTP workflows. The example process 600 is shown to help understand how the O-RAN ZTP technologies in accordance with the present disclosure helps running of an O-RAN in accordance with the present disclosure. It should be understood the steps shown in FIG. 6A, while sequential, is not intended to be limited to the specific sequence shown in FIG. 6A. In some other examples, relevant sequences for the process 600 may be different from that shown in FIG. 6A.

In some examples, the ZTPO can use various ZTP technologies in an O-RAN to 1) install/update network hardware components (such as RUs) in cell sites, 2) install/update network functionality components (such as DUs, CUs, orchestrator, and/or any other networking components in the O-RAN) in data centers, and/or any other operations without someone needing to configure those components locally where they are located. For example, a new or replacement device can be sent to a cell site, physically installed and powered up by a locally present employee, who is not required to have IT skills. This is when the ZTPO can use ZTP technologies to automatically carry out the software installation, updates, the configuration of the device, and connect the device to the O-RAN.

In the example process 600 for setting up, provisioning, and operating an O-RAN in accordance with the present disclosure, at electronic processor 402, a network environment is typically set up. At 602, operations such as setting up various network function components (for example, those mentioned above) in one or more data centers is performed to facilitate the operation of the O-RAN. For example, this may involve implementing network function components according to one or more design specifications for the O-RAN, pre-CSR integration of the various network function components, emulating DUs for the O-RAN for setting up the network environment using the various network function components, implementing one or more transport tools, and/or any other operations. During this stage, a ZTP layer can be implemented, for example such as the O-RAN ZTP layer shown in FIG. 2.

At 604, a cell site can be set up in the network environment set up at 602. For example, in the 5G context shown in FIG. 2, this may involve installing one or more RUs in the cell site, laying cables in the cell site, configurating one or more CSRs for the cell sites, making connections from the RUs to the CSRs, making connections from the cell site to a core network in the network environment, making connections between the cell site and any other cell sites, and/or any other operations. During this stage, functions or services can be automatically provisioned or commissioned on various components. For instance, after an RU device is installed in the cell site (such as cell site 202*a* or 202*b* shown in FIG. 2) and powered up for the first time, a communication address can be automatically assigned to the RU device. Then, the O-RAN ZTP layer can automatically configure the RU device through the communication address assigned to the RU device. As another example, a CSR implemented in the cell site can be automatically integrated into the network environment according to a network specification configured with the O-RAN ZTP layer after the CSR is ready to function in the network environment.

At 606, continuous integration and continuous deployment (CI/CD) of various network function components are carried out in the network environment set up at 602. CI/CD is a set of practices that enable how software, in this case, O-RAN software, is installed and updated. CI or Continuous Integration is the practice of merging all developers working code to a shared mainline several times at a frequency. Every merge is typically validated before merging to uncover any issues. CD or Continuous Delivery/Deployment is the practice in which software developers produce reliable software in short cycles that can be released (delivered) at any time, which can then be deployed at a frequency. As a result, any software can be released much faster, more frequently and reliably into O-RAN. The benefit of CD is more predictable deployments that can happen on demand without waiting for an "official" upgrade cycle—this is now thing of the past.

Examples of CI/CD at 606 can include infrastructure deployment or update including the following components: networking stack, computing stack, storage stack, monitoring stack, security stack, core network functions. In some embodiments, the CI/CD at 606 can include Cloud-Native Network Functions (CNF) deployment and update. For instance, a CNF is deployed onto one or more CUs using control tools. In some embodiments, the CI/CD at 606 can include deploying a specific application or tool for a specific CNF. In some embodiments, changes to various network function components are deployed in the network environment continuously. In implementations, a ZTP workflow is used to facilitate the aforementioned CI/CD operations. In some configurations, the ZTP workflow is deployed within the O-RAN ZTP layer shown in FIG. 2. In that implementation, the ZTP workflow defines various stages through which software code is retrieved from a source code repository, is built into corresponding artifacts (e.g., micro-services, network functions), is tested using predefine tests, and is deployed in the network environment after successful results of the testing.

At 608, a cell site is updated, for example, with latest software or configuration. This may be triggered at a preset frequency configured at the ZTP layer in the network environment. For instance, a cadence such as every week may be set to update software deployed on the components in the cell site, such as RUs, DUs, CSRs, and/or any other components. However, this is not necessarily the only case. Operations at 608 can also involve configuring or provisioning devices or components newly installed in the cell site—e.g., replacement or new devices. Similar to operations at 604, in such situations, software can be pushed to the newly installed devices or components by the ZTP layer once they are live in the network environment.

In implementations, operations involved in 604 may be referred to as "day 0" operations. Operations involved in 602 may be referred to as "day 1" operations. Operations involved in 606 may be referred to as "day 2" operations. Operations involved in 608 may be referred to as "day 3" operations. The numerical references in these operations do not necessarily indicate that these operations have to happen in a time sequence. As shown in FIG. 6A, operations in the example process 600 can happen in any sequence. For example, after a day "0" operation in 604 happens, the process 600 can proceed to 602 to push a specific configuration that involves components in the "day 0" operation to a core network (such as the 5G core 208 shown in FIG. 2), and then proceed to 608 to update another cell site (e.g., to configure that cell site to be connected to the cell site set up in the day 0 operation). Other scenarios are contemplated. According to some examples, the workflow engine 302 can orchestrate deployment of cell sites in parallel. For instance, the workflow engine 302 may coordinate the ZTPO workflows for the deployment of two, three, ten, a hundred cell sites, and the like at the same time.

FIG. 6B illustrates another example process 650 showing an example of how ZTP and CI/CD are facilitated in an O-RAN in accordance with the present disclosure. Process 650 illustrates the ZTP and CI/CD in the O-RAN in accordance with the present disclosure from a perspective of O-RAN operation cycles.

At 652, an activity or operation at a cell site triggers an automation in the ZTP layer of the O-RAN. For example, this may involve a replacement of a RU device in the cell site is brought online by a personnel present at the cell site. Once the RU device is online, the RU device may generate a request for software update, e.g., security patch, and configuration of the RU device, and such a request may be received by the ZTPO in the ZTP layer in the O-RAN. In some embodiments, the ZTPO in the ZTP layer may be configured to monitor activities across cell sites in the network environment and the automation is triggered by the ZTPO once the replacement RU device is detected to be online.

At 654, lower-level network (e.g., radio network or RAN) CI/CD can be carried out. In some situations, the operations in 654 are triggered by one or more activities at 652. For example, as illustration, after the replacement RU device is brought online and configured by the ZTP layer in the O-RAN, one or more components in a CSR, DU and/or CU is to be configured to record the replacement RU device. In that example, the ZTP layer in the O-RAN can trigger such a configuration so the lower-level network is updated to incorporate the replacement RU into the O-RAN. In some situations, the lower-level network CI/CD at 654 is independent of the activities at cell sites. For instance, the software developers for particular types of CSR, DU or CU can set a CI/CD pipeline and schedule deployment of their latest software on the CSR, DU or CU at a preset frequency (e.g., nightly or weekly).

At 656, network service CI/CD is performed. In some situations, the CI/CD operations in 656 are triggered by one or more operations or changes in at 654. For example, as illustration, after software is deployed at the lower network level at 654, one or more network services are updated based on the deployment of the software. For instance, without limitation, in the context of 5G, various 5G network services can be updated after the underlying RAN in the 5G O-RAN are updated. In some situations, the CI/CD operations in 656 are independent of operations or changes at 654. For example, software developers of the core network services for the 5G O-RAN can set up a schedule to release their software to update the core network services on a regular basis.

At 658, operations control the ZTP in the O-RAN are performed. Examples of these operations can include scheduling release of software to update O-RAN components, instantiating a DU or CU, provisioning an RU or CSR in a cell site, and/or any other operations. In some examples, the operations at 658 are performed using a NOC such as the NOC 210 shown in FIG. 2. It should be understood although process 650 is illustrated so far from 652 to 658 in sequence, this is not intended to limit the O-RAN ZTP technologies in accordance with the present disclosure to a bottom up or top-down approach. In a top-down approach, ZTP is instigated, for example, at 658 and software is pushed to the core network, lower network level, and/or cell sites through the workflow engine 302 in the ZTP layer in the O-RAN. In a bottom-up approach, ZTP request is generated, for example, by a component at a cell site or data center, and software is pushed to that component through the workflow engine 302 in the ZTP layer in the O-RAN. In various embodiments, a ZTP request is configured for instigating one or more ZTP operations in the O-RAN. In some situations, ZTP can be carried out by a third-party vendor to update its components in the O-RAN in a mixture of bottom-up and top-down approach. For instance, the third-party vendor may ship a router device to a cell site, which is installed by a technician on the cell site. Once the router device is live, it generates its status information to a management server of the third-party vendor for configuration of the router. In that example, the third-party vendor dynamically configures the router according to specifications or requirements of the O-RAN where the router is installed. In this way, a mixture of bottom-up and top-down ZTP is used to configure the router.

Figure 7:
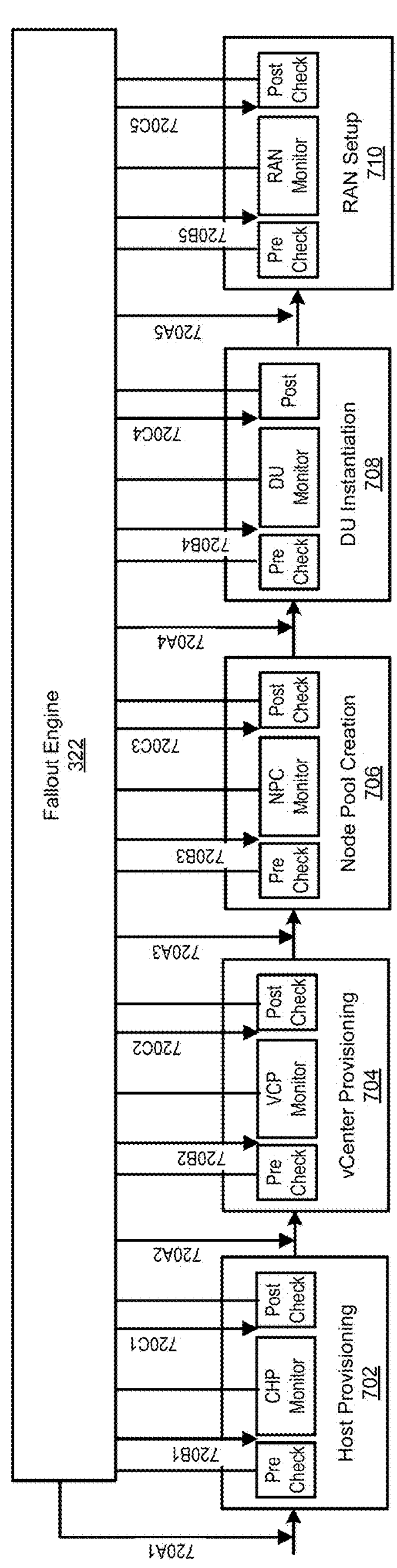
FIG. 7 illustrates an example of a fallout engine, in accordance with the present disclosure.

FIG. 7 illustrates fallout handling for different ZTP workflows, in accordance with some examples.

In this example, the pipeline 700 comprises different workflows/stages for computer host provisioning (CHP) 702, virtual server management provisioning (VSMP) (e.g., VMware vCenter provisioning (VCP)) 704, node-pool creation (NPC) 706, distributed unit instantiation (DUI) 708, and radio access network (RAN) setup 710. While not illustrated, other pipelines/workflows can be included. In various embodiments, the pipeline 700 is implemented by a ZTP orchestrator such as the workflow engine 302 and/or the workflow management component 306, the validation can be performed by the validation engine 312, and the fallout handling is performed by the fallout engine 320.

According to some embodiments, the fallout engine 322 performs fallout operations at different points in the workflows (e.g., pre-check, monitoring performance of the ZTP operations, and post-check), and after determining that an issue/error has been resolved, resuming execution of the workflow at a point prior to, or at the point of the error. As illustrated in FIG. 7, indicators 720A1, 720A2, 720A3, 720A4, and 720A5 show returning to a point in the pipeline 700 to restart execution of the workflow after determining that an issue is resolved after an occurrence of a pre-check error. Indicators 720B1-5 show returning to a point in the pipeline 700 to restart execution of the workflow after determining that an issue is resolved that occurred during the execution of the operations for the workflow, and indicators 720C1-5 show returning to a point in the pipeline 700 to restart execution of the workflow after determining that an issue is resolved after an occurrence of a post-check error.

At 702, the computer host provisioning workflow is performed. As discussed above, the CHP workflow performs ZTP operations to provision the computer hosts (e.g., a server from a particular vendor). The computer hosts can be configured and set up from scratch so that they are brought into the core network to facilitate O-RAN. As part of the host provisioning, one or more validations can be performed by the validation engine 312. For example, a pre-check (e.g., a Pre-CHP validation) can be performed to determine if the environment is ready to perform the stage (e.g., the data is specified, software needed is deployed, . . . ). In various embodiments, this validation may involve the validation engine 312 collecting data from the workflow engine 302, the network management component 308, the site management component 314, the inventory management component 304, and/or any other components, as well as performing one or more tests to determine whether prerequisites for executing the CHP workflow are satisfied. Generally, the pre-check may check any specification/condition to help ensure that the pre-requisites to performing operations in the workflow are satisfied.

For purposes of explanation, assume that the validation engine 312 generated error data that identified that software needed for the CHP is not installed. In some examples, the fallout engine 320 accesses the error data and generates fallout data that identifies the software required for the CHP, and the responsible party/component for installing the software. According to some configurations, the fallout engine 320 generates one or more tickets (e.g., using ticketing engine 322) and causes the ticket(s) to be provided to the responsible party/component so that the software can be installed. In some examples, the fallout engine 320 determines when the software is installed (e.g., the issue/error is resolved), closes the ticket(s), and then causes the CHP workflow 702 to continue to the next operation. In this way, the pipeline 700 can continue.

After performing any pre-checks, the operations described in the CHP workflow are performed. For example, the CHP workflow may include operations, such as but not limited to reserving a range of IP addresses for the one or more computer hosts being provisioned in the CHP stage, sending a trigger to a bare metal orchestrator (BMO) to instruct the BMO that the one or more computer hosts can be provisioned, performing, and installing an ESXI component (e.g., provided by VMware) on the one or more computing hosts. According to some examples, the fallout engine 322, the validation engine 312, the workflow engine 302, and/or some other device/component is configured to monitor the different operations to identify when an error occurs. If an error occurs, the fallout engine 322 may perform one or more fallout operations (e.g., identifying the error, identifying the responsible party/component to address the error, generating a ticket(s), distributing the ticket(s), determining that the error is resolved, and then re-attempting the operation that caused the error).

Continuing with the example, after performing the operations for CHP, a post-check validation can be performed. In various embodiments, the post-CHP validation may involve the validation engine 312 performing, or cause to be performed, pinging the computer hosts that have been provisioned in the CHP to ensure they are reachable, performing various sanity tests to ensure they function properly according to one or more roles they are assigned to in the O-RAN, identifying one or more issues in the CHP ZTP operations, and/or any other steps. Generally, when an error is identified, the fallout engine 322 may perform one or more fallout operations (e.g., identifying the error, identifying the responsible party/component, generating a ticket(s), distributing the ticket(s), determining that the error is resolved, and then re-attempting the check after the issue is resolved).

During vCenter provisioning 704, the fallout engine 322 performs fallout handling for any errors/issues that occur during a pre-check, the operations for VCP, and a post-check. In some examples, ZTP operations are performed to provision a VMware vCenter. vCenter is a server management software provided by VMware that provides a centralized platform for controlling VMware vSphere environments, that allows automation and delivering a virtual infrastructure across the O-RAN. ESXI hardening may also be performed. This may involve enabling the ESXi, for example installed in the CHP, normal lockdown mode to prevent root access to the hosts over the network. The post-check may include checking whether the vCenter provisioned is ready to facilitate the O-RAN.

At 706, the fallout engine 322 performs fallout handling for any errors/issues that occur during a pre-check, the operations for NPC, and a post-check. In some examples, the NPC workflow performs ZTP operations to create a node pool. A node pool is a group of nodes within a cluster that all have the same configuration. According to some configurations, the node pool is created for a Kubernetes cluster. As an example, the pre-check NPC validation may involve checking an identification for the node pool to be created is unique in the O-RAN, a number of nodes in the node pool is valid, the nodes are alive, various parameters for creating the node pool are available and set, and/or any other checks. In some examples, NPC may involve creating the node pool as the Kubernetes cluster, setting a volume for the node pool, specifying a path to the volume, and/or any other operations. The post-check may involve checking the node pool created at 1304 is alive and functions properly.

At 708, the fallout engine 322 performs fallout handling for any errors/issues that occur during a pre-check, the operations for DUI, and a post-check. In some examples, ZTP operations are performed to a instantiate a distributed unit. A distributed unit (DU) provides support for lower layers of the protocol stack such as the RLC, MAC and Physical layer. The pre-check for DUI may involve checking an identification for the DU to be created is unique in the O-RAN, various parameters for creating the DU are available and set, and/or any other checks. Instantiating the DU may involve configuring the DU to facilitate real-time baseband processing function. Various protocols can also be configured into the given DU, such as RLC, PDCP MAC and/or any other lower-level protocols. The DU is also configured to communicate with at least one RU in a cell site. The post-check may involve checking the DU created functions properly.

At 710, the fallout engine 322 performs fallout handling for any errors/issues that occur during a pre-check, the operations for RAN setup, and a post-check. As discussed above, the RAN pipeline performs ZTP operations to configured for RAN a cell site. The pre-check may include determining that a DU registration success indication is received. The RAN setup may be configured for a cell site using ZTP operations. One or more RUs, DUs, and a CU can create a gNodeB, which can serve as a radio access network (RAN). The post-check may involve checking that the RAN created at 1504 functions properly.

Figure 8:
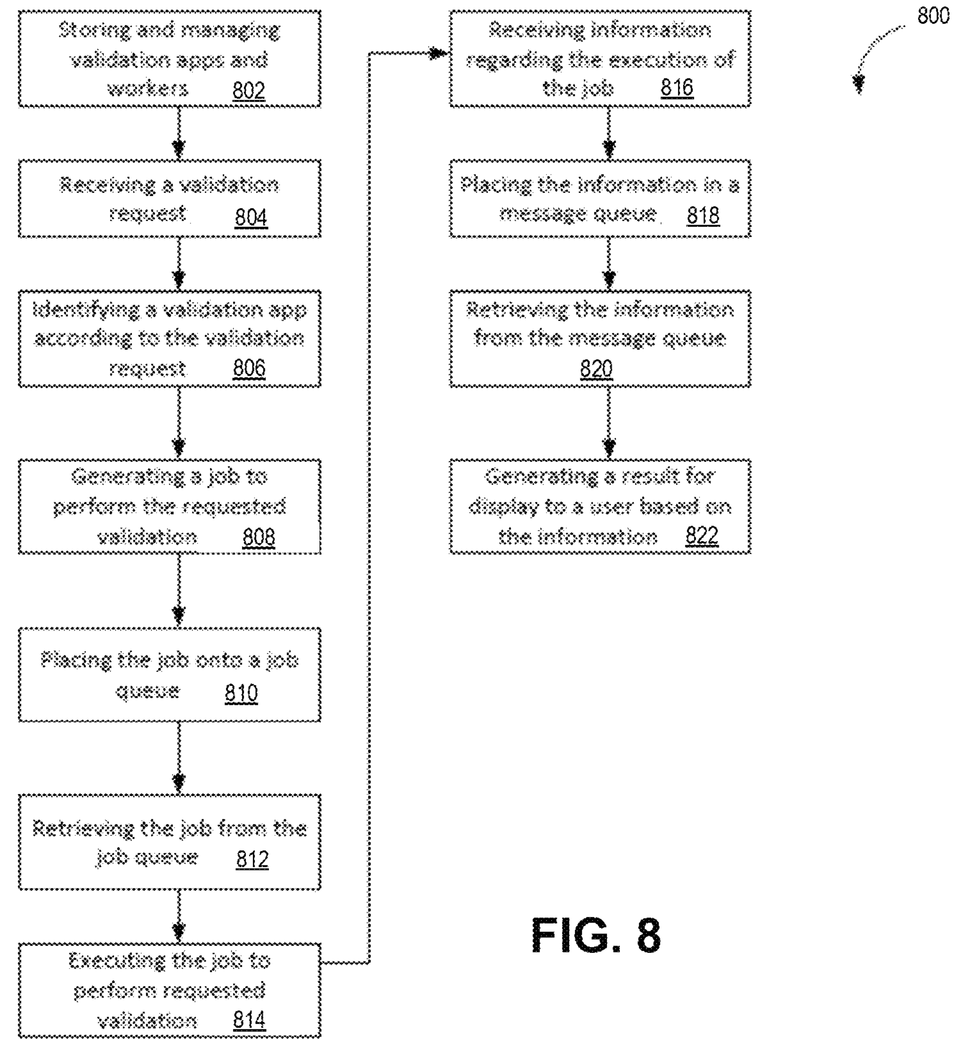
FIG. 8 illustrates a method for performing a validation, in accordance with the present disclosure.

In FIG. 8, a validation method 800 is provided in accordance with some embodiments. It will be described with references to FIG. 3-7. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

Figure 11:
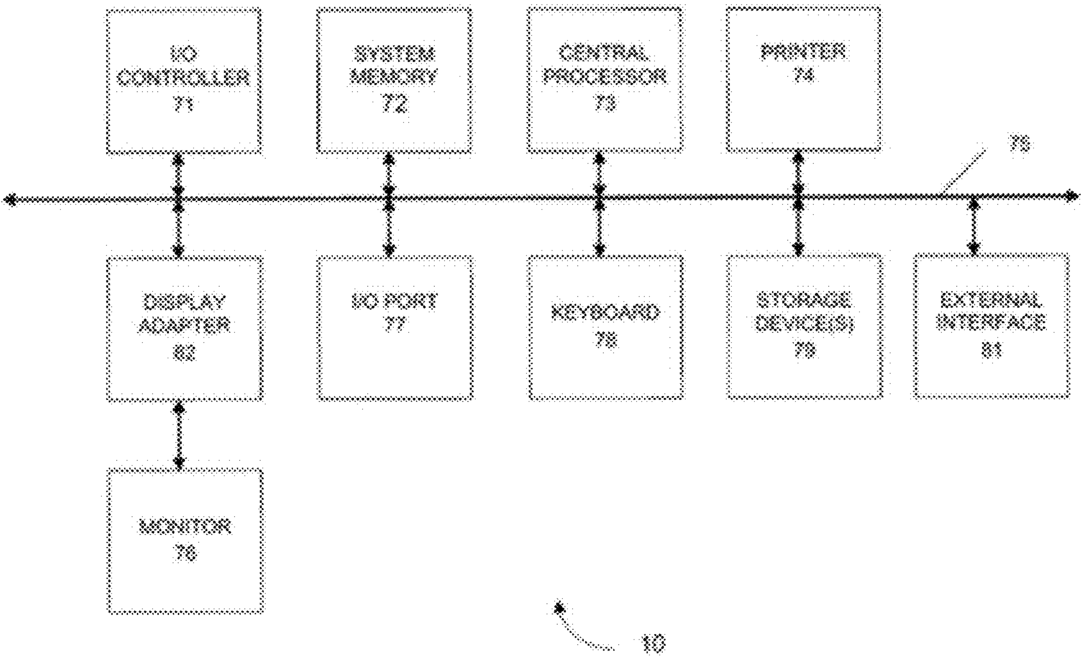
FIG. 11 generally illustrates an example computing platform that can be used to implement various components and methods described and illustrated herein.

In some embodiments, method 800 may be implemented by a device including one or more of the processors, such as the ones shown in FIG. 11. The device may include a digital processor, an analog processor, a digital circuit designed to process information, an analog circuit designed to process information, a state machine, and/or other mechanisms for electronically processing information. The device may execute some or all of the operations of method 800 in response to instructions stored electronically on an electronic storage medium. The device may include one or more components configured through hardware, firmware, and/or software to be designed for execution of one or more of the operations of method 800.

At 802, validation apps and validation workers are stored and managed. As described above and herein, individual validation apps may be developed for different types of validation flows or pipelines. In various embodiments, the validation apps are configured with intelligence to handle corresponding validation flows. In various example, validation apps are developed for pre-checks, post-checks, and operations relating to CHP, VCP, node pool creation, DUI, and RAN setup. More specifically, the validation apps may be developed for validations, such as but not limited to pre-CHP, post-CHP, pre-virtual node cluster creation, post-virtual node cluster creation, post CSR, post DU, post RAN, and/or any other types of validation apps.

In a given validation app, individual steps, tasks, or procedures are provided to complete the corresponding validation flow. For instance, a pre-CHP validation flow can be configured with steps for validating data readiness before provisioning a particular CHP; and a post-CHP validation flow can be configured with steps for validating a result of the CHP. In various embodiments, the validation apps are configured to generate jobs for completion by the validation workers. For example, without limitation, the pre-CHP validation apps can be configured to generate a job to validate the network management component, a job to validate the inventory management component, a job to validate workflow engine and/or any other jobs. The individual jobs can be picked up by individual validation workers.

The validation workers are configured to complete the validation jobs—for example, validation workers can be developed to validate the network management component, which may involve communicating with the network management component; can be developed to validate the inventory management component; can be developed to validate the workflow engine; and/or any other types of validation workers. In various implementations, an individual validation worker may have one or more corresponding validation workers. For example, a pre-CHP validation app may have a network management component validation worker for CHP, an inventory management component validation worker for CHP, a workflow engine validation worker for CHP, and/or any other validation workers.

At 804, a validation request is received. As mentioned above, the validation request can be related to validating a ZTP operation and/or a ZTP workflow. Example validation request received at 402 includes pre-CHP, post CHP, post CSR, post DU, post RAN, and/or any other validation request. In various embodiments, the validation request may be received by a load balancer such as the load balancer illustrated and described in FIG. 5.

At 806, a validation app is identified for performing the requested validation received. For example, the identified validation app is an app developed to handle pre-CHP validation and is available for use. In various embodiments, the validation worker may be identified by a load balancer such as the load balancer illustrated and described in FIG. 5.

At 808, a validation job is generated by the validation app identified for performing the requested validation. For example, the pre-CHP validation worker identified may generate a job to validate data readiness of a network management component. In various embodiments, the validation job may be received by a load balancer such as the load balancer illustrated and described in FIG. 5.

At 810, the validation job is placed onto a job queue by the validation app. In various embodiments, the job queue is implemented using an in-memory data store, such as redis queue. In various embodiments, the validation job may be placed onto the job queue by a validation app such as the validation app illustrated and described in FIG. 5.

At 812, the validation job placed on the job queue is retrieved by a validation worker. For example, a validation worker configured to perform pre-CHP validation can pick up the job.

At 814, the validation job is performed by the validation worker. At 816, information regarding the execution of the validation job is received by the validation worker. At 818, the information received by the validation worker is placed onto a message queue. At 820, the information is retrieved by the validation app. At, a result is generated by the validation app for display to a user based on the information.

Figure 9:
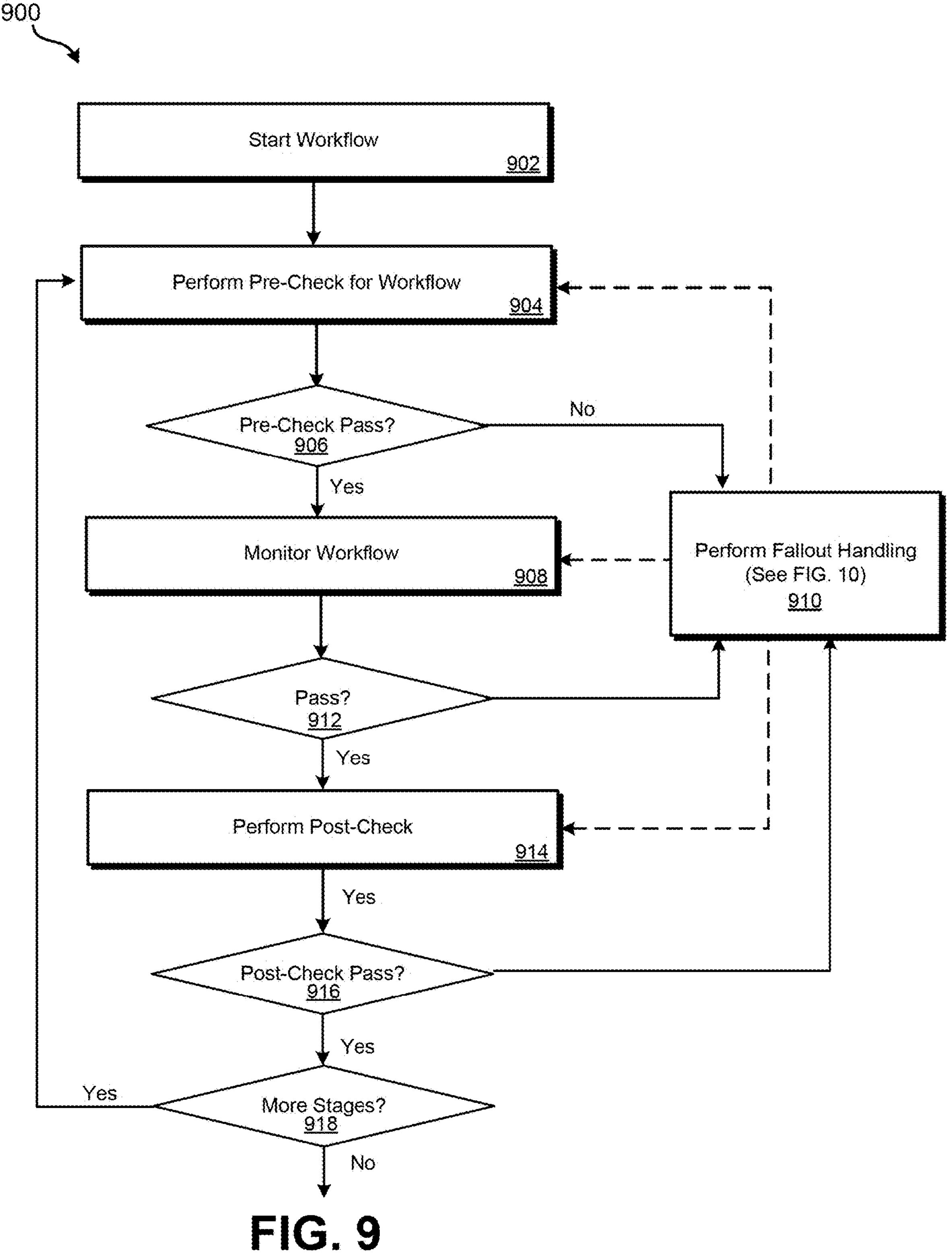
FIG. 9 illustrates a method for performing validations and fallout handling, in accordance with the present disclosure.

In FIG. 9, a validation and fallout handling method 900 is provided in accordance with some embodiments. It will be described with references to FIG. 3-7. The operations of method 900 presented below are intended to be illustrative. In some embodiments, method 900 may be accomplished with one or more additional operations not described and/or without one or more of the operations discussed. Additionally, the order in which the operations of method 900 are illustrated in FIG. 9 and described below is not intended to be limiting.

In some embodiments, method 900 may be implemented by a device including one or more of the processors, such as the ones shown in FIG. 11. The device may include a digital processor, an analog processor, a digital circuit designed to process information, an analog circuit designed to process information, a state machine, and/or other mechanisms for electronically processing information. The device may execute some or all of the operations of method 900 in response to instructions stored electronically on an electronic storage medium. The device may include one or more components configured through hardware, firmware, and/or software to be designed for execution of one or more of the operations of method 900.

At 902, a workflow is started. As discussed above, a workflow may be a stage in a pipeline for deploying a cell site. In other examples, a workflow may be associated with performing other operations. According to some examples, a workflow may be associated with setting up devices in a core network of the O-RAN (e.g., within a cloud environment) as well as setting up devices in individual cell sites facilitating the O-RAN. In various examples, workflows managed by the workflow engine 302 and/or workflow management component 306 may include but are not limited to computer host provisioning (CHP) workflows, virtual server management provisioning (VSMP) workflows (e.g., VMware vCenter provisioning (VCP)), node-pool creation (NPC) workflows, distributed unit instantiation (DUI) workflows, radio access network (RAN) initiation workflows, and/or other workflows. According to some embodiments, the workflows may be completed in a specified order, such as CHP workflow before execution a VSMP workflow, and the like.

At 904, a pre-check validation can be performed by the validation engine 312. As discussed above, individual validation apps may be developed for different types of validation flows or pipelines. In various embodiments, the validation apps are configured with intelligence to handle corresponding validation flows. In various example, validation apps are developed for pre-checks for different ones of the workflows (e.g., CHP, VCP, NPC, DUI, RAN, . . . ). In some examples, a validation worker places validation information regarding the execution of the validation job onto a message queue, such as message cache 510. The validation information may indicate whether the pre-check passed or did not pass.

At 906, a determination is made as to whether the pre-check validation passed. When the pre-check validation passes, the process flows to 908. When the pre-check validation does not pass, the process flows to 910 for fallout handling.

At 908, the workflow is monitored. As discussed above, the validation engine 312, the workflow engine 302, the fallout engine 320, or some other device/component may monitor the operations performed to determine whether the operations completed successfully. In some examples, a timeout is specified that indicates how long the execution of the operations associated with the current stage are allowed to take before an error is generated. For example, one stage may have a timeout of ten minutes, another stage may have a timeout of fifteen minutes, and the like. In this way, an error is detected in the stage in situations when the workflow is not progressing through the operations for the stage.

At 910, fallout handling is performed. As discussed above, according to some embodiments, the fallout engine 320 performs fallout operations for the different points in the workflows (e.g., pre-check, monitoring performance of the ZTP operations for the stage, and post-check). When the fallout engine 320 pauses the workflow (e.g., a hard fallout), then, after determining that the issue/error has been resolved, the fallout engine 320 cause the workflow to resume at a point in the workflow prior to the occurrence of the error. See FIG. 10 and related discussion for further details.

At 914, a post-check is performed. As discussed above, the validation engine 312 may perform a post-check validation to determine whether the workflow performed the operations successfully.

At 916, a determination is made as to whether the post-check validation passed. When the post-check validation passes, the process flows to 916. When the post-check validation does not pass, the process flows to 910.

At 918, a determination is made as to whether there are more stages/workflows. When there are more stages, the process flows to 904. When there are not more stages, the process ends and returns to processing other actions.

In FIG. 10, a fallout management method 1000 is provided in accordance with some embodiments. It will be described with references to FIG. 3-7. The operations of method 1000 presented below are intended to be illustrative. In some embodiments, method 1000 may be accomplished with one or more additional operations not described and/or without one or more of the operations discussed. Additionally, the order in which the operations of method 1000 are illustrated in FIG. 10 and described below is not intended to be limiting.

In some embodiments, method 1000 may be implemented by a device including one or more of the processors, such as the ones shown in FIG. 11. The device may include a digital processor, an analog processor, a digital circuit designed to process information, an analog circuit designed to process information, a state machine, and/or other mechanisms for electronically processing information. The device may execute some or all of the operations of method 1000 in response to instructions stored electronically on an electronic storage medium. The device may include one or more components configured through hardware, firmware, and/or software to be designed for execution of one or more of the operations of method 900.

At 1002, validation information is accessed that identifies any errors with a validation test. As discussed above, the fallout engine 320 may access the validation information generated by the validation engine 312 from the message cache 510. In other examples, the validation engine 312 may send the validation information directly to the fallout engine 320 upon the occurrence of an error during a validation test, or shortly after the validation test.

At 1004, the error(s) are identified by the fallout engine 320. As discussed above, the validation information may provide an indication of what type of error occurred, what validation test failed, what components are involved, what provider(s) is/are responsible for resolving the error, and the like. In some examples, the fallout engine 320 determines a type of the error that determines whether the workflow can continue while addressing the error or is paused until the error is resolved. More details are provided below.

At 1006, a message can be provided to an orchestrator, such as the workflow engine 312 indicating the error(s). As discussed above, message may include information that assists the workflow engine 312 and/or the workflow management component 306 to orchestrate the workflows. For example, the message may indicate that the workflow can continue while the error is resolved, or paused until the error is resolved.

At 1008, one or more tickets is generated. As discussed above, fallout engine 320 may generate one or more tickets using the ticketing engine. The ticketing engine 322 is configured to perform ticketing operations related to the O-RAN network. For example, the ticketing engine 322 may automatically create a ticket based on an error identified by the fallout engine 320. Generally, a ticketing engine 322 allows authorized personnel to track, manage, speed up, and deal effectively with incidents.

At 1010, the ticket(s) are distributed. In some examples, the ticketing engine 322 can automatically distribute and assign incidents to the appropriate personnel based on the validation information and/or information obtained from the fallout engine 320.

At 1012, a determination is made as to whether the issue is resolved. As discussed above, the fallout engine 320 may wait for some period of time to determine whether the error(s) have been resolved. When the error(s) have not been resolved, the fallout engine 320 waits the predetermined amount of time. When the error(s) have been resolved, the process flows to 1014.

At 1014, the ticket(s) are closed. As discussed above, the ticket(s) are closed when the errors/issues/failures are resolved. In some examples, the fallout engine 320 instructs the ticketing engine 322 to close the ticket(s).

At 1016, the fallout engine 320 restarts the workflow at a point at, or before, where the errors/issues/failures occurred. For example, the workflow may return to a point in the pipeline before a pre-check, at some point during the operations for the workflow, or return to a point before a post-check.

Example Computer System

Any of the computer systems and embodiments mentioned herein may be implemented by or utilize any suitable number of subsystems. Examples of such subsystems are shown in FIG. 11 in computer system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 11 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Example Cell Site Router and Server Cabling Verification

Connectivity between a cell site router (CSR) is established by cabling a plurality of network ports (such as Ethernet ports) between the CSR and the server. Correct operation of the CSR and server requires particularity on how the network ports between the two are connected. However, the ports look alike, and cabling mistakes can be costly to fix, especially as they require dispatching a technician to a base station site. In the prior art, cable verification depends on a visual inspection of the cabling.

By performing an accurate cable verification between a CSR (such as, a CISCO CSR) and a server (such as, Dell XR11) the possibility of port swap issues that result in site integration fall-out are eliminated. Possibility of inoperable cables and/or ports is also reduced. The verification may be performed prior to shipping or after deployment at a site. The verification may be performed at a staging area before shipping it to a base station site, for example, by a technician. The verification provides for a more robust deployment of cellular base stations.

Figure 12:
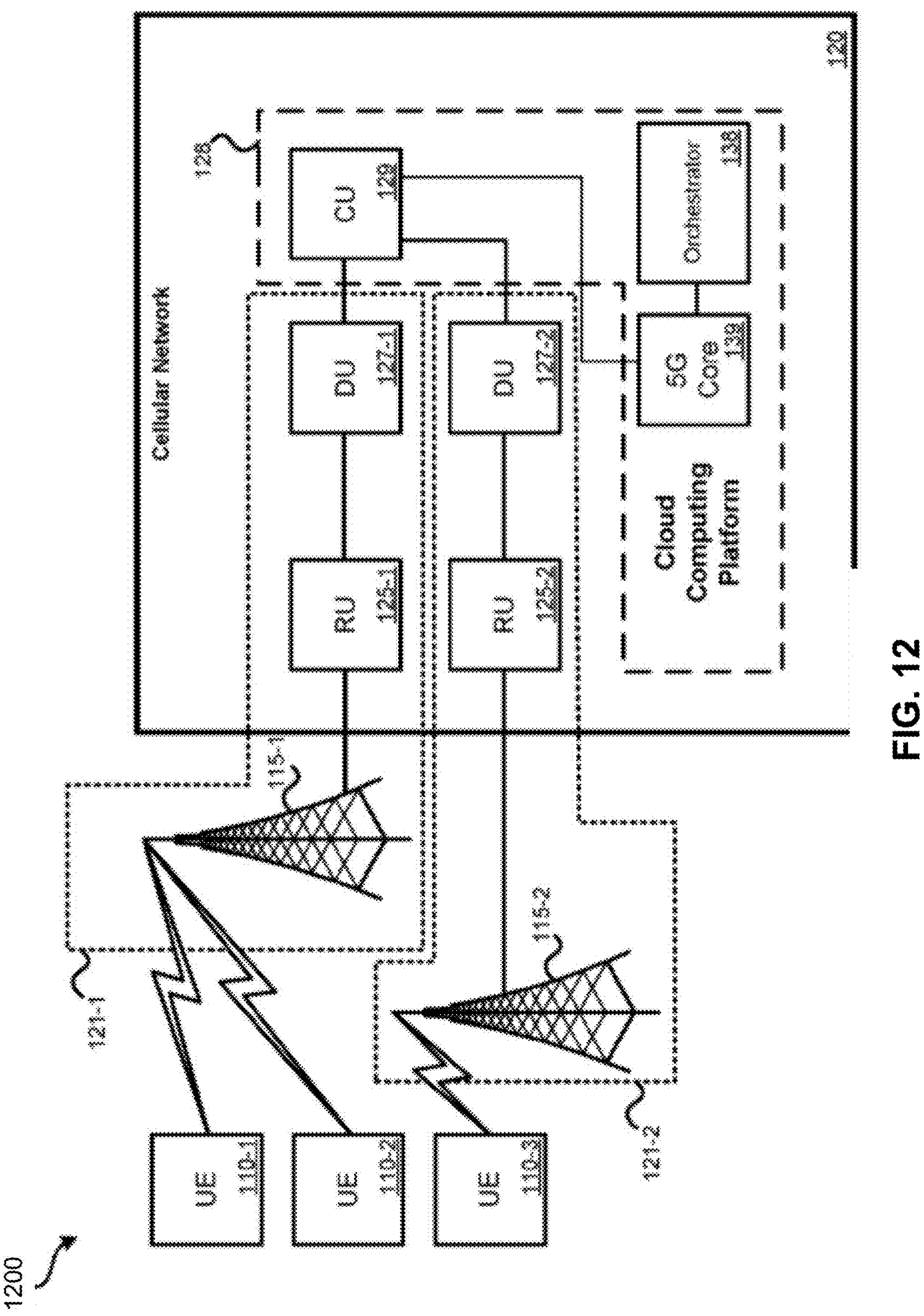
FIG. 12 illustrates a hybrid cloud cellular network, in accordance with the present disclosure.

FIG. 12 illustrates a block diagram of a hybrid cellular network system 1200. System 1200 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), most components, except for components that need to receive and transmit RF, can be implemented as specialized software executed on general-purpose hardware or servers. For at least some components, the hardware may be maintained by a separate cloud-service computing platform provider. Therefore, the cellular network operator may operate some hardware (such as, RUs and local computing resources on which DUs are executed) connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE 110 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, or the like. Depending on the location of individual UEs, UE 110 may use RF to communicate with various BSs of cellular network 120. BS 121 may include an RU (e.g., RU 125-1) and a DU (e.g., DU 127-1). Two BSs 121 (BS 121-1 and BS 121-2) are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 12 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on a cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g., helm charts), creating Kubernetes nodes/pods, loading DU containers, configuring the DU, and activating other support functions (e.g., Prometheus, instances/connections to test tools). While this instantiation of a DU may be triggered by orchestrator 138, a chaos test system may introduce false DU container images in the repo, may introduce latency or memory issues in Kubernetes, may vary traffic messaging, and/or create other "chaos" to conduct the test. That is, chaos test system is not only connected to a DU but is connected to all the layers and systems above and below a DU, as an example.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

A cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 13:
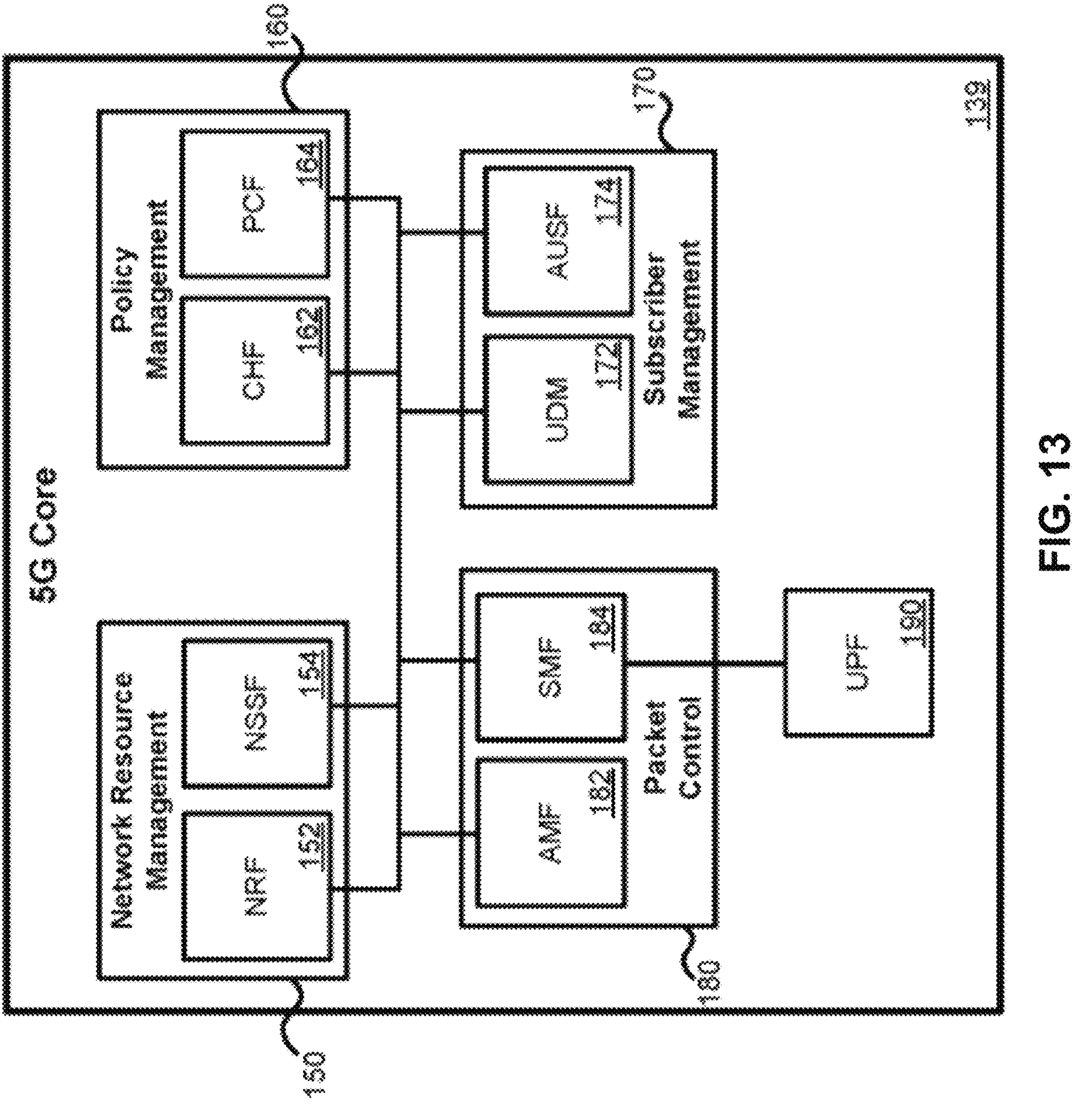
FIG. 13 illustrates a 5G Core, in accordance with the present disclosure.

FIG. 13 illustrates a block diagram of a cellular network core, which can represent 5G core 139. 5G core 139 can be implemented on a cloud-computing platform. 5G core 139 can be physically distributed across data centers or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 13 as part of 5G core 139 are merely exemplary. Many more or different functions may be implemented in the cellular network core and may vary by slice. The amount of computing resources devoted to a particular function can vary by slice.

Figure 14:
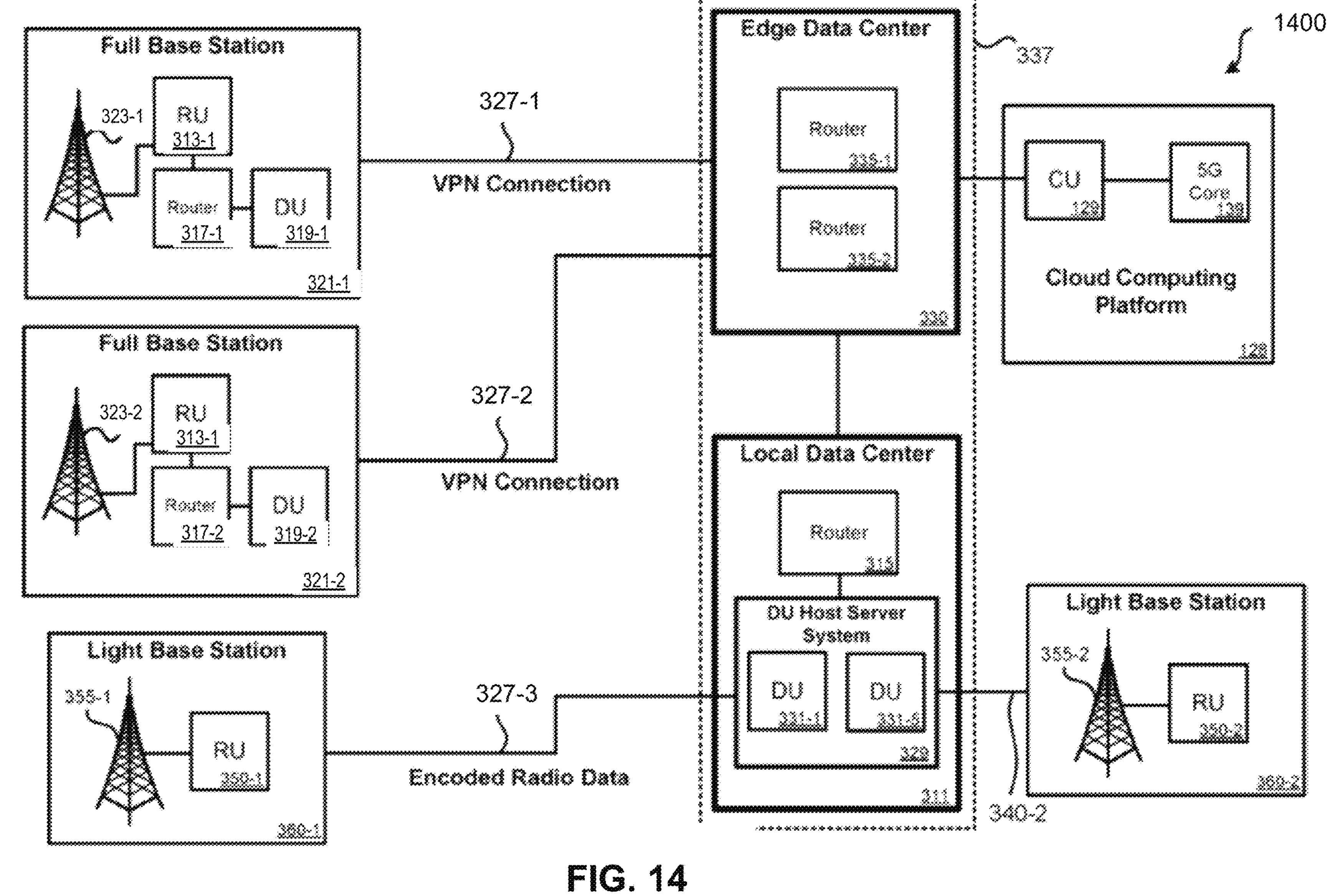
FIG. 14 illustrates a hybrid cloud cellular network architecture, in accordance with the present disclosure.

FIG. 14 illustrates an embodiment of hybrid cellular network system 1400 that includes hybrid use of local and remote DUs in communication with a cloud computing platform that hosts the cellular network core. System 1400 can include: LDC 311; light BSs 360; full BSs 321; VLAN connections 327; edge data center 330 ("EDC 230"); CU 129; and 5G core 139, which are executed on cloud computing platform 128. In system 1400, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC. In system 1400, either light BSs 360 or full BSs 321 may be referred to as a cell site.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 321 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 321, which include on-site DUs 319, may connect with the cellular network through EDC 330. A full BS, such as full BS 321-1, can include: RU 313-1; router 317-1; DU 319-1; and structure 323-1. Router 317-1 may have a connection to a high bandwidth communication link with EDC 330. Router 317-1 may route data between DU 319-1 and EDC 330 and between DU 319-1 and RU 313-1. In some embodiments, RU 313-1 and one or more antennas are mounted to structure 323-1, while router 317-1 and DU 319-1 are housed at a base of structure 323-1. Full BS 321-2 functions similarly to full BS 321-1. While two full BSs 321 and two light BSs 360 are illustrated in FIG. 14, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 327-1 between full BSs 321 and EDC 330 may occur over a fiber network. For example, while the connection between light BS 360-1 and LDC 370 can be understood as a dedicated point-to-point communication link on which addressing is not necessary, full BS 321-1 may operate on a fiber network on which addressing is required. Multiprotocol label switching (MPLS) segment routing (SR) may be used to perform routing over a network (e.g., fiber optic network) between full BS 321-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 321-1. While MPLS SR can be used for the network connection between full BSs 321 and EDC 330, it should be understood that other protocols and non-fiber-based networks can be used for connections 327.

For communications across connection 327-1, a virtual local area network (VLAN) may be established between DU 319-1 and EDC 330, when a fiber network that may also be used by other entities is used. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 321 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Validation Checks

A process for remote and/or onsite verification of cabling accuracy between a cell site router (CSR) and a server is provided. The verification may be performed in a staging environment and a live environment. Verification of cabling accuracy may mitigate occurrence of port swap issues that result in a site integration fall-out.

According to various embodiments, verification includes obtaining and comparing MAC addresses as seen by a Cell Site Router (CSR) and an onsite server with a cabling configuration to verify port accuracy of the cabling. The process may be performed by a computer process. In some embodiments, the computer process may be implemented using Python. The verification may be performed granularly, for example, for a target CSR and server combination. The verification may be batched to verify a group of target CSR and server combinations.

Figure 15:
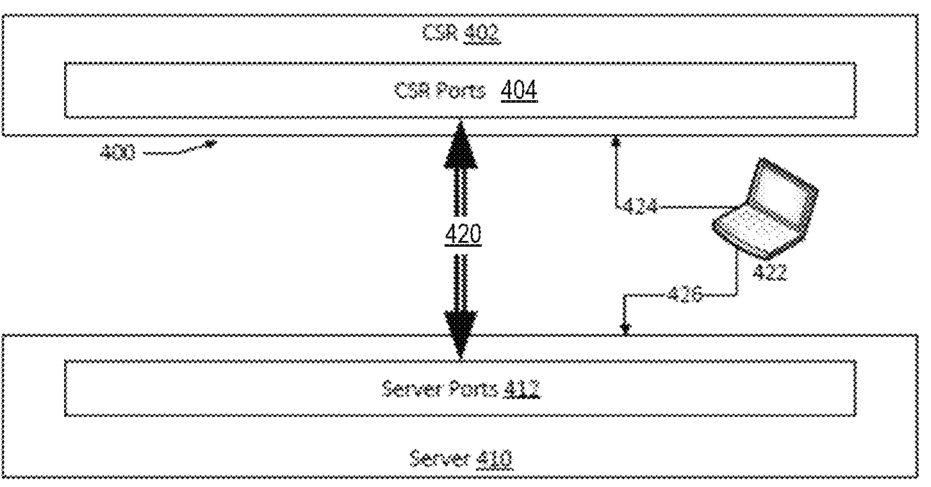
FIG. 15 illustrates a logical view of a cabling verification system for a CSR and a server, in accordance with the present disclosure.

FIG. 15 illustrates a logical view of a cabling verification system 400 for a CSR 402 and a server 410. The cabling verification system 400 may be setup by a technician. The technician may determine a wiring configuration based on a server type of the server 410 and a CSR type of the CSR 402. In some embodiments, there may be only one wiring configuration. The technician then connects cables 420 between the CSR ports 404 and the server ports 412 per the determined wiring configuration. A console 422 is connected to the CSR 402 via a CSR connection 424 and to the server 410 via a server connection 426, and the CSR 402 and the server 410 are powered on. Optionally, the technician inputs port identifiers for the CSR connection 424 and the server connection 426 to a verification program (not shown) hosted on the console 422 and begins execution of the verification program.

The CSR ports 404 may number 1 to N, while the server ports may number 1 to M. The wiring configuration may include connecting cables 420 between the CSR ports 404 and the server ports 412. The wiring configuration may include connecting port number x of CSR ports 404 to port number y of the server ports 412 with one of the cables 420. A count of wires may be greater than or equal to 4, greater than or equal to 6 or the like. A majority of the CSR ports 404 may look alike and be closely packed. A majority of the server ports 412 may look alike and be closely packed. A count of the cables 420 may be greater than 4, greater than 6 or the like. A larger count of the cables 420 increases a likelihood of port swap, even with color coding and the like.

The CSR connection 424 may be a network connection or a USB connection. The server connection 426 may be a network connection or a USB connection. The CSR connection 424 and the server connection 426 may be via a jump server or a trusted IP address. The CSR connection 424 and the server connection 426 may be via a VPN.

Figure 16:
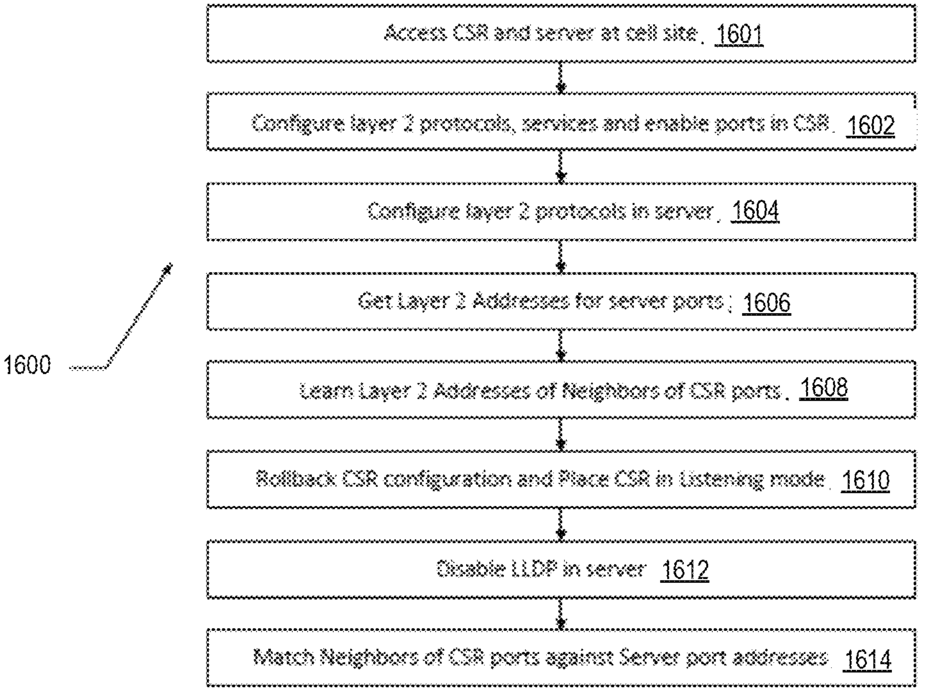
FIG. 16 illustrates a method for cabling verification of a CSR and a server, in accordance with the present disclosure.

The verification program may execute and push the entire required configuration, logs, and outputs command used to collect network address information, for example, the MAC address information needed for the wiring configuration. The wiring configuration may include a CSR port ID corresponding to a server port ID. The server port IDs may be different than CSR port IDs. The wiring configuration is further explained with respect to FIG. 18, FIG. 16 illustrates a method for cabling verification of a CSR and a server, according to various embodiments. FIG. 17A, FIG. 17B, and FIG. 17C illustrate exemplary script excerpts of a cabling verification program according to various embodiments.

A method 1600 for cabling verification of a CSR and a server may include an operation 1601 to access a CSR and a server at a cell site. The cell site may be a stage cell site or a fielded cell site. The fielded cell site may be full base station or a lite base station. CSRs disposed at a edge data center may be tested via other means. Operation 1601 may include collecting a password and target cell site IDs. In operation 1601, the target cell site IDs may be entered per line and/or as a file listing the target cell site IDs. For example, after your password has been inserted, a blank text document may be populated with the site IDs of the target CSRs, preferably, one site ID per row. After the document is saved and closed, the script may log into a jump server, and then simultaneously log into each target CSR.

Output for the script may be logged into separate directories, for example, one per cell site. In some embodiments, the script may be threaded and operations for each of the target CSRs/cell sites may be performed in parallel or concurrently. Operation 1601 may resolve a network address to connect to a target site and a CSR type to identify the vital interfaces of each target cell site. In some embodiments, the CSR type may be hard coded, for example, a CISCO CSR. In some embodiments, the CSR and server ports may be hard coded for the CSR type. In some embodiments, the jump server may be responsible for resolving network addresses for each cell site name. In some embodiments, the jump server may be replaced by a different identification and authentication methodology.

The method 1600 for cabling verification of a CSR and a server may include an operation 1602 to configure protocols, services and enable ports in the CSR. The protocols and services may provide layer 2 information for the network ports. The protocol may be the Link Layer Discovery Protocol (LLDP) coupled with a Level 2 Virtual Private Network (L2VPN) service. Operation 1602 may be performed per an exemplary script excerpt of FIG. 17A.

A method 1600 for cabling verification of a CSR and a server may include an operation 1604 to enable the layer 2 protocols, such as, LLDP, on the server. Operation 1604 may be performed per an exemplary script excerpt of FIG. 17B.

The method 1600 may include operation 1606 to get the layer 2 addresses of each network port listed in the wiring configuration of the server. A Media Access Control (MAC) address is a layer 2 address. Operation 1606 may be performed using a system command, such as, getsysinfo, hwinventory. The MAC addresses may be obtained from an output of the system command. Exemplary server ports may include a BMC MGMT port, an EXSi MGMT port, a PTP port, a front-haul port, a VMWare MGMT port, a mid-haul port, and the like.

The method 1600 may include operation 1608 to learn Layer 2 addresses of a distal address of the CSR ports. Each of the distal addresses may be a layer 2 address of a layer 2 neighbor, in other words, the layer 2 address of a network port at a distal end of the cable connecting a respective CSR port to a server port. The CSR may include ports such as a BMC MGMT port, an eXSi MGMT port, a PTP port and multiple DU Ports. The learning of distal layer 2 address is performed by extracting the distal address reported in an output of a CSR command. For example, for a BMC MGMT port the distal address is output by the command "show l2vpn mac-learning mac all location 0/rp0/cpu0". Distal layer 2 addresses of other CSR ports may be learned by extracting MAC addresses from the output of a CSR command, such as "sh lldp neighbors". The learned distal layer 2 addresses may be matched against the addresses retrieved during operation 1606.

The method 1600 may include operation 1610 to rollback the CSR configuration in order to leave the CSR unaffected by the verification program.

The method 1600 may include operation 1612 to disable the layer 2 service, such as, the LLDP service on the server, for example, with the commands of FIG. 17C.

The method 1600 may include operation 1612 to check layer 2 addresses of the CSR ports against layer 2 addresses of the server. The check may match the MAC addresses of each wire to validate correct connectivity. The check may normalize the level 2 addresses from the CSR and the server prior to matching them.

FIG. 18 illustrates an output of the method 1600 as rows according to various embodiments.

The table 1800 may include CSR port IDs 1802 (canonical names), CSR distal port addresses 1804 (Layer 2/MAC addresses of the CSR ports), server port IDs 1806 (canonical names), server port addresses 1808 (Layer 2/MAC addresses of the server ports), and a match status 1810.

Exemplary pairings of a wiring configuration include one of the CSR port IDs 1802 and one of the server port IDs 1806 listed in a row 1814 of the output 1800. The CSR port IDs 1802 maybe input into commands executed on the CSR by the operations of the method 1600. The server port IDs 1806 maybe input into commands executed on the server by the operations of method 1600. In some embodiments, the pairings of the wiring configuration may be hard coded into a script, for example, a Python script. The pairings may be based on a CSR type and a server type, for example, CSR port IDs may change by a CSR type, or server port IDs may change by a server type.

In the method 1600, the server port addresses 1808 are populated by the getting per operation 1606. For each of the pairings, a respective server port address is populated with the layer 2 address retrieved for the server port ID of the pairing.

In the method 1600, the CSR distal port addresses 1804 are populated by the learning per operation 1608. For each of the pairings, a respective CSR distal address is populated with the layer 2 distal address learned for the CSR port ID of the pairing.

In the method 1600, the match status 1810 is determined, for example, by the matching per operation 1614. The matching may normalize the CSR port addresses 1804 and the server port addresses 1808 prior to comparing or matching them. If the port addresses match, then the method 1600 lists MATCH in the match status 1810. If the port addresses do not match, the method 1600 lists MISMATCH in the match status 1810. The match status 1810 may be color-coded, for example, a green background for declaring a match and a red background for declaring a mismatch.

At the staging area, a technician can fix mismatched cabling based on the standard cable connections or wiring configuration. When the CSR and server are in the field, a truck roll may be initiated to fix the mismatched cabling.

Fallout Handling

In this section, data fallout handling, according to some examples, is described. For example, during the process illustrated in FIG. 16, at any point, the process may halt due to data fallout. In that situation, due to the automatic nature of the process, proper data fallout handling is needed. In various embodiments, a set of rules are developed for possible fallout scenarios during the process shown in FIG. 16. In those embodiments, if one or more of the rules are broken during the process shown in FIG. 16, a workflow engine, ticketing engine, or some other device/component is caused to create a ticket in a ticketing system. The ticket has a number of parameters and other information to identify one or more issues/problems/symptom during the fallout in the process shown in FIG. 16.

Figure 19:
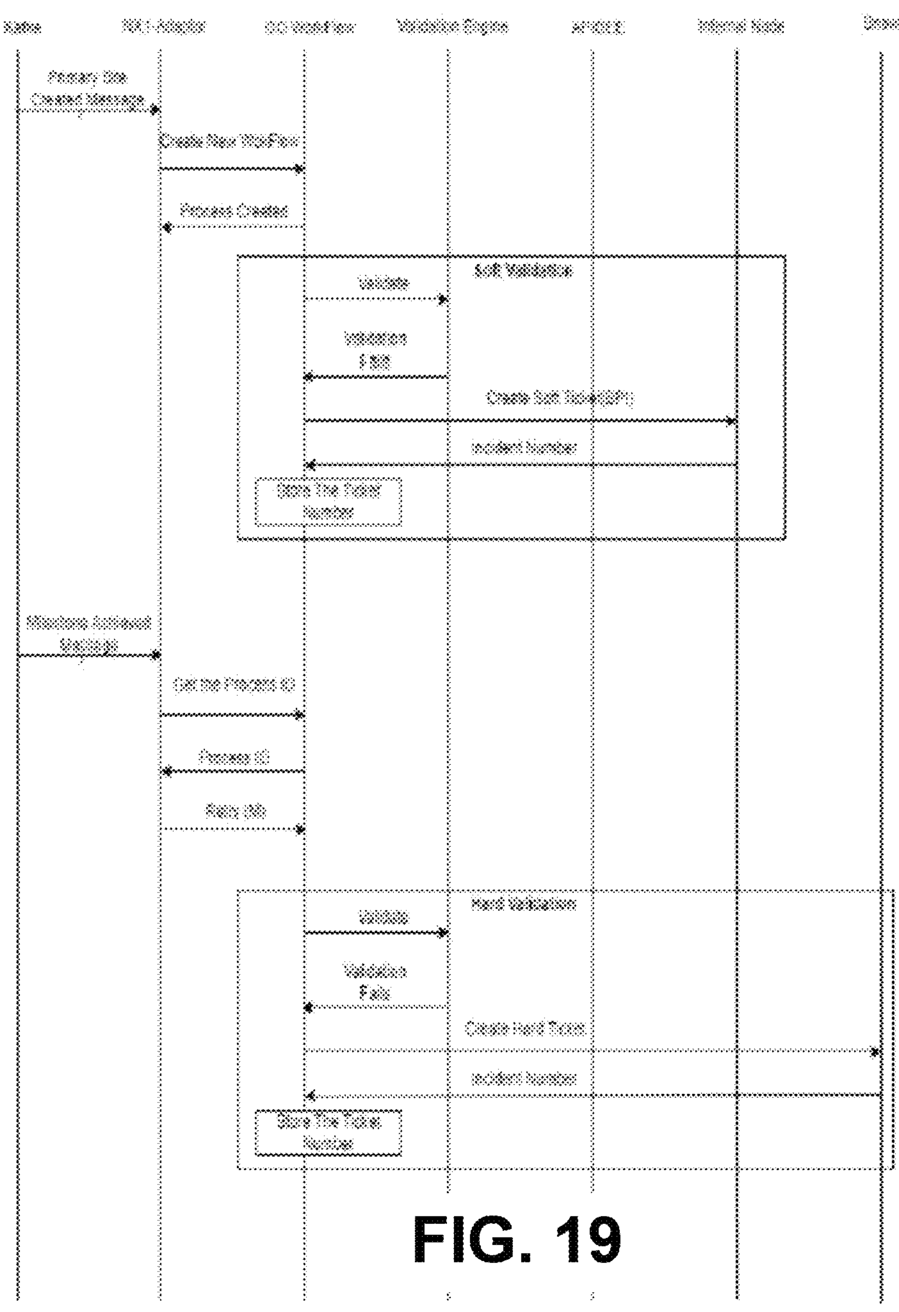
FIG. 19 illustrates an example of a data fallout handling process, in accordance with the disclosure.

FIG. 19 illustrates one example of a data fallout handling process in accordance with the disclosure.

In this example, a workflow is created for validating a particular automation procedure, such as the CSR verification illustrated and described herein. As can be seen, a validation is developed to execute a workflow for validating the automation procedure. Attention is directed to the soft validation in FIG. 19. The Go Workflow (a workflow management component) provides a particular workflow to the validation engine, for example a CSR validation workflow. The validation then executes the workflow, and if the validation fails, the validation engine returns the fail status to the Go Workflow, which then creates a soft ticket through the internal ticketing system provided by a 5G operator, such as DISH, which as shown includes a APIGEE and an internal node (e.g., an internal computer). The internal ticket system then returns an incident number to the GO Workflow, which then stores the ticket number. This can facilitate addressing the validation fallout internally by the 5G operator. This soft validation process may be repeated until one or more milestones are achieved, such as the CSR is up and running appropriately.

Attention is now directed to the hard validation, which is more stringent than the soft validation. In hard validation, if a validation fails, a special ticketing system (such as SNOW) is used, which addresses the validation failure in a more stringent manner until it is fixed. In some examples, a validation error identified as a hard validation error follows hard fallout handling that causes the workflow to pause until the error is resolved.

Figure 20:
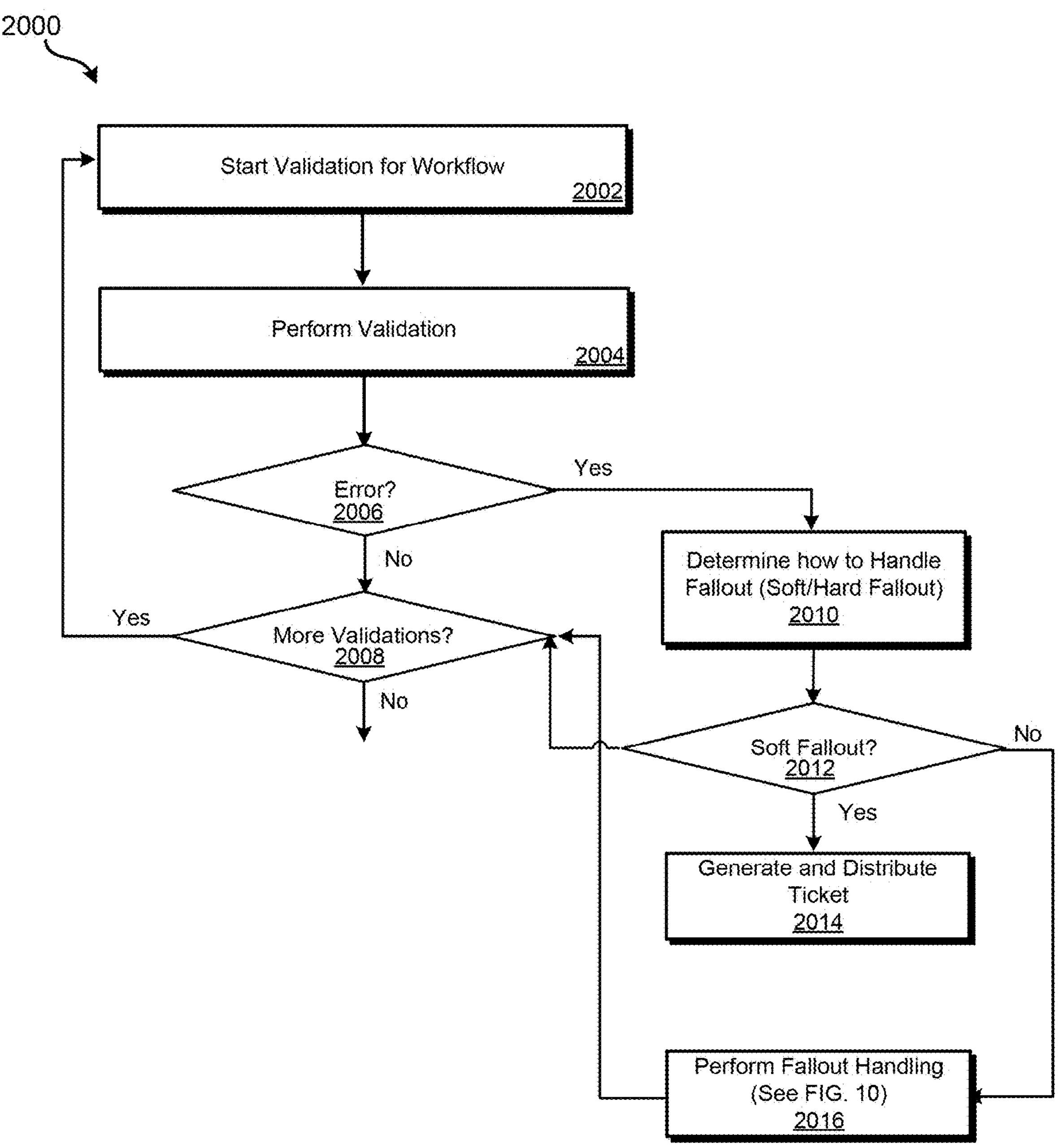
FIG. 20 illustrates a validation and fallout handling method, in accordance with the disclosure.

FIG. 20 illustrates a validation and fallout handling method 2000, in accordance with some embodiments. It will be described with references to FIG. 3-19. The operations of method 2000 presented below are intended to be illustrative. In some embodiments, method 2000 may be accomplished with one or more additional operations not described and/or without one or more of the operations discussed. Additionally, the order in which the operations of method 2000 are illustrated in FIG. 20 and described below is not intended to be limiting.

In some embodiments, method 2000 may be implemented by a device including one or more of the processors, such as the ones shown in FIG. 11. The device may include a digital processor, an analog processor, a digital circuit designed to process information, an analog circuit designed to process information, a state machine, and/or other mechanisms for electronically processing information. The device may execute some or all of the operations of method 2000 in response to instructions stored electronically on an electronic storage medium. The device may include one or more components configured through hardware, firmware, and/or software to be designed for execution of one or more of the operations of method 2000.

At 2002, a validation check for a workflow is started. As discussed above, a workflow may be a stage in a pipeline for deploying a cell site. In other examples, a workflow may be associated with performing other operations. According to some examples, a workflow may be associated with setting up physical devices in a core network of the O-RAN (e.g., within a cloud environment) as well as setting up devices in individual cell sites facilitating the O-RAN. For instance, the validation and fallout handling may relate to installing cabling for physical components (e.g., servers, routers, . . . ), installing RUs, installing servers, and the like. In various examples, the validations performed by the validation engine 312 may include validations relating to the deployment of physical resources and/or software resources. According to some configurations, validations performed by the validation engine 312, and fallout handling performed by the fallout engine 320 are used for computer host provisioning (CHP) workflows, virtual server management provisioning (VSMP) workflows (e.g., VMware vCenter provisioning (VCP)), node-pool creation (NPC) workflows, distributed unit instantiation (DUI) workflows, radio access network (RAN) initiation workflows, and/or other workflows.

At 2004, a validation can be performed by the validation engine 312. As discussed above, individual validation apps may be developed for different types of validation flows or pipelines. In various embodiments, the validation apps are configured with intelligence to handle corresponding validation flows. In various example, validation apps are developed for different ones of the workflows (e.g., CHP, VCP, NPC, DUI, RAN, . . . ). In some examples, a validation worker places validation information regarding the execution of the validation job onto a message queue, such as message cache 510. The validation information may indicate whether the validation check passed not.

As an example, one or more validations may be performed by the validation engine 312 to validate a cabling configuration to verify port accuracy of the cabling, obtaining and comparing MAC addresses as seen by a Cell Site Router (CSR), determining if a computing device is reachable from another device. The verification may be performed granularly, for example, for a target CSR and server combination. The verification may be batched to verify a group of target CSR and server combinations.

For instance, if the validation is verifying a cabling configuration, the validation engine 312 may execute a verification program that is hosted on a computing device, such as computing device 422 illustrated in FIG. 15. According to some configurations, the validation engine 312 executes and pushes the entire required configuration, logs, and outputs command used to collect network address information, for example, the MAC address information needed for the wiring configuration between the CSR and the server. In the current example, a first validation check may be determining whether a target CSR is reachable at a cell site. In some examples, the validation engine 312 uses a jump server to log into the target CSR being validated.

At 2006, a determination is made as to whether the validation passed. When the validation passes, the process flows to 2008. When the validation does not pass, the process flows to 2010 for fallout handling.

At 2008, a determination is made as to whether there are more validations for the current workflow. As discussed above, the validation engine 312 may be configured to perform many different validations. For instance, the validation engine 312 may be configured to perform the steps illustrated in FIG. 16. When there are more validations, the process flows to 2002. When there are not any more validations, the process may return to processing other actions.

At 2010, a determination is made as to whether the fallout is a soft fallout or a hard fallout. As discussed above, according to some embodiments, the fallout engine 320 determines whether the error is an error that should pause the workflows for performing computer host provisioning (CHP), virtual server management provisioning (VSMP) (e.g., VMware vCenter provisioning (VCP)), node-pool creation (NPC), distributed unit instantiation (DUI), radio access network (RAN) initiation, and the like. In some examples, the fallout engine 320 accesses fallout configuration data that indicates the condition(s) for a soft fallout, and/or the condition(s) for a hard fallout. As an example, in some configurations, if the validation involves determining if five RUs have been deployed, the fallout engine 320 may determine that the workflows can continue (e.g., a soft fallout) as long as at least one RU is available at a cell site. In this example, if no RUs are available, the fallout engine 320 may determine that the workflows should pause until at least one RU is available (e.g., a hard fallout).

At 2012, a determination is made as to whether to perform a soft fallout or a hard fallout. When the determination is to perform a soft fallout, the process flows to 2014. When the determination is to perform a hard fallout, the process flows to 2016.

At 2014, a ticket is generated and distributed to the responsible party. As discussed above, the fallout engine 320 may use a ticketing engine 322 to generate at ticket and distribute to the responsible party to address the error (e.g., a field engineer).

At 2016, fallout handling is performed. As discussed above, in some examples, the execution of the workflows (e.g., to deploy a cell site) may be paused until an error is addressed.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for fallout handling associated with zero-touch provisioning (ZTP) of open radio access network (O-RAN) components associated with cell sites, the method comprising:

determining, via one or more processors, a type of fallout handling to perform for a physical device provisioned by a workflow that performs zero-touch provisioning associated with deployment of a cell site;

accessing, via one or more processors, validation data for a validation of the physical device;

determining, via the one or more processors and based on the validation data, an occurrence of an error associated with the physical device;

generating, via the one or more processors, a ticket for the error;

providing, via the one or more processors, the ticket to a computing device associated with a user responsible to resolve the error; and causing, via the one or more processors and based at least in part on the type of fallout handling to perform, an execution of the workflow to continue while the error remains unresolved, or the execution of the workflow to pause until the error is resolved; and causing a validation app to perform the validation, wherein the validation determines a readiness of the physical device;

wherein the validation app is selected based at least in part on one or more of the physical devices validated by the validation app, a manufacturer associated with the validation app, or a vendor associated with the validation app.

2. The method of claim 1, further comprising:

determining, via the one or more processors, that the error is resolved; and causing the execution of the workflow to resume at a location prior to, or at a point in the workflow, where the error occurred.

3. The method of claim 1, further comprising determining, via the one or more processors, an identification of the user responsible to resolve the error.

4. The method of claim 1, wherein the workflow is associated with a plurality of workflows that include a computer host provisioning (CHP) stage, a virtual server management provisioning (VSMP) stage, a node-pool creation (NPC) stage, a distributed unit instantiation (DUI) stage, and a radio access network (RAN) initiation stage.

5. The method of claim 1, wherein the validation is a cabling verification for a cell site router (CSR) and a computing device within the cell site.

6. The method of claim 5, wherein the cabling verification includes operations for one or more of configuring protocols, services and enable ports in the CSR, enabling layer 2 protocols on the computing device, obtaining layer 2 addresses of each network port listed in a wiring configuration of the computing device, learning Layer 2 addresses of a distal address of CSR ports, rolling back a CSR configuration to leave the CSR unaffected by the cabling verification, disabling a layer 2 service, and checking layer 2 addresses of the CSR ports against layer 2 addresses of the computing device.

7. The method of claim 1, further comprising causing the ticket to automatically be closed based on the determining that the error is resolved.

8. The method of claim 1, further comprising providing a message to an orchestrator that facilitates orchestration of the workflow, where the message identifies the workflow and the error.

9. A system including one or more electronic processors configured to for perform fallout handling associated with zero-touch provisioning (ZTP) of open radio access network (O-RAN) components associated with cell sites, wherein the system comprises:

an orchestrator configured to orchestrate execution of a workflow that includes performing zero-touch provisioning of physical devices associated with deployment of a cell site;

a validation engine configured to perform validations for the workflow including a validation of one or more of the physical devices; and a fallout engine configured to determine a type of fallout handling to perform for a physical device provisioned by the workflow;

access validation data for a validation of the physical device;

determine, based on the validation data, an occurrence of an error associated with the physical device;

generate a ticket for the error;

provide the ticket to a computing device associated with a user responsible to resolve the error; and cause, based at least in part on the type of fallout handling to perform, an execution of the workflow to continue while the error remains unresolved, or the execution of the workflow to pause until the error is resolved;

wherein the validation engine is further configured to cause a validation app to perform the validation, wherein the validation determines a readiness of the physical device;

wherein the validation app is selected based at least in part on one or more of the physical devices validated by the validation app, a manufacturer associated with the validation app, or a vendor associated with the validation app.

10. The system of claim 9, wherein the fallout engine is further configured to:

determine that the error is resolved; and cause the execution of the workflow to resume at a location prior to, or at a point in the workflow, where the error occurred.

11. The system of claim 9, wherein the validation is a cabling verification for a cell site router (CSR) and a computing device within the cell site.

12. The system of claim 11, wherein the cabling verification includes operations for one or more of configuring protocols, services and enable ports in the CSR, enabling layer 2 protocols on the computing device, obtaining layer 2 addresses of each network port listed in a wiring configuration of the computing device, learning Layer 2 addresses of a distal address of CSR ports, rolling back a CSR configuration to leave the CSR unaffected by the cabling verification, disabling a layer 2 service, and checking layer 2 addresses of the CSR ports against layer 2 addresses of the computing device.

13. The system of claim 9, wherein the fallout engine is further configured to provide a message to the orchestrator, where the message identifies a location of the error, and the error.

14. A non-transitory computer-readable medium configured to facilitate fallout handling associated with zero-touch provisioning (ZTP) of open radio access network (O-RAN) components associated with cell sites, and wherein the non-transitory computer-readable medium, when executed by a computer, causes the computer to:

determine a type of fallout handling to perform for a physical device provisioned by a workflow that performs zero-touch provisioning associated with deployment of a cell site;

access validation data for a validation of the physical device;

determine, based on the validation data, an occurrence of an error associated with the physical device;

generate a ticket for the error;

provide the ticket to a computing device associated with a user responsible to resolve the error;

cause, based at least in part on the type of fallout handling to perform, the execution of the workflow to continue while the error remains unresolved, or the execution of the workflow to pause until the error is resolved; and cause a validation app to perform the validation, wherein the validation determines a readiness of the physical device;

wherein the validation app is selected based at least in part on one or more of the physical devices validated by the validation app, a manufacturer associated with the validation app, or a vendor associated with the validation app.

15. The non-transitory computer-readable medium of claim 14, wherein the validation is a cabling verification for a cell site router (CSR) and a computing device within the cell site.

16. The non-transitory computer-readable medium of claim 15, wherein the cabling verification includes operations for one or more of configuring protocols, services and enable ports in the CSR, enabling layer 2 protocols on the computing device, obtaining layer 2 addresses of each network port listed in a wiring configuration of the computing device, learning Layer 2 addresses of a distal address of CSR ports, rolling back a CSR configuration to leave the CSR unaffected by the cabling verification, disabling a layer 2 service, and checking layer 2 addresses of the CSR ports against layer 2 addresses of the computing device.

* * * * *